United States Patent
Nakata et al.

(10) Patent No.: US 6,850,031 B2
(45) Date of Patent: Feb. 1, 2005

(54) ELECTRIC MOTOR CONTROLLER

(75) Inventors: Hideki Nakata, Shijonawate (JP); Kaneharu Yoshioka, Katano (JP); Mitsuo Ueda, Nishinomiya (JP); Yasuhiro Arai, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 178 days.

(21) Appl. No.: 10/087,703

(22) Filed: Feb. 28, 2002

(65) Prior Publication Data

US 2002/0149342 A1 Oct. 17, 2002

(30) Foreign Application Priority Data

| Mar. 2, 2001 | (JP) | ........ | 2001-058958 |
| May 29, 2001 | (JP) | ........ | 2001-161228 |
| Nov. 5, 2001 | (JP) | ........ | 2001-339765 |

(51) Int. Cl.$^7$ ............... H02P 5/34; H02P 7/42
(52) U.S. Cl. .......... 318/801; 318/800; 318/254
(58) Field of Search .............. 318/800–811

(56) References Cited

U.S. PATENT DOCUMENTS

| 4,677,360 | A | * | 6/1987 | Garces | ........ 318/803 |
| 5,334,923 | A | * | 8/1994 | Lorenz et al. | ........ 318/805 |
| 5,475,293 | A | * | 12/1995 | Sakai et al. | ........ 318/802 |
| 5,486,743 | A | * | 1/1996 | Nagai | ........ 318/439 |
| 6,025,692 | A | | 2/2000 | Yamada et al. | |
| 6,191,545 | B1 | * | 2/2001 | Kawabata et al. | ........ 318/439 |
| 6,208,109 | B1 | * | 3/2001 | Yamai et al. | ........ 318/716 |
| 6,531,843 | B2 | * | 3/2003 | Iwaji et al. | ........ 318/727 |
| 6,534,948 | B2 | * | 3/2003 | Ohura et al. | ........ 318/798 |

FOREIGN PATENT DOCUMENTS

| FR | 2 767 875 A3 | 3/1999 | |
| JP | 02276494 A | 11/1990 | |
| JP | 2000262089 A | * 9/2000 | ........... H02P/7/63 |

OTHER PUBLICATIONS

Jang–Mok Kim, "Speed Control of Interior Permanent Magnet Synchronous Motor Drive for the Flux Weakening Operation," IEEE, 33 No. 1, 43–48 (Jan./Feb. 1997).

M. F. Rahman, "Comparison of Torque Responses of the Interior Permaent Magnet Motor Under PWM Current and Direct Torque Controls," The 25$^{th}$ Annual Conference of the IEEE San Jose, California, Nov. 29, 1999, 1464–1470.

Feng X. Wang, "Waveform Optimization Design of an AC Converter Machine," IEEE, 25 No. 3, 436–440 (May/Jun. 1989).

* cited by examiner

*Primary Examiner*—Robert Nappi
*Assistant Examiner*—Renata McCloud
(74) *Attorney, Agent, or Firm*—Akin Gump Strauss Hauer & Feld, LLP

(57) ABSTRACT

The present invention provides a motor controller capable of driving a synchronous motor having no position sensor stably at high efficiency by carrying out simple control. In order to attain this purpose, a reactive current is obtained from a motor current and a rotation phase, an error voltage is obtained from the reactive current and the command value of the reactive current, thereby obtaining a motor applied voltage command value Va that is used to compensate for the V/f characteristic of the motor. Furthermore, the motor applied voltage command value Va is applied to an output command computing section, and computed with the rotation phase signal of a wave generation section, thereby obtaining a signal for PWM driving the switching devices of an inverter circuit.

24 Claims, 29 Drawing Sheets

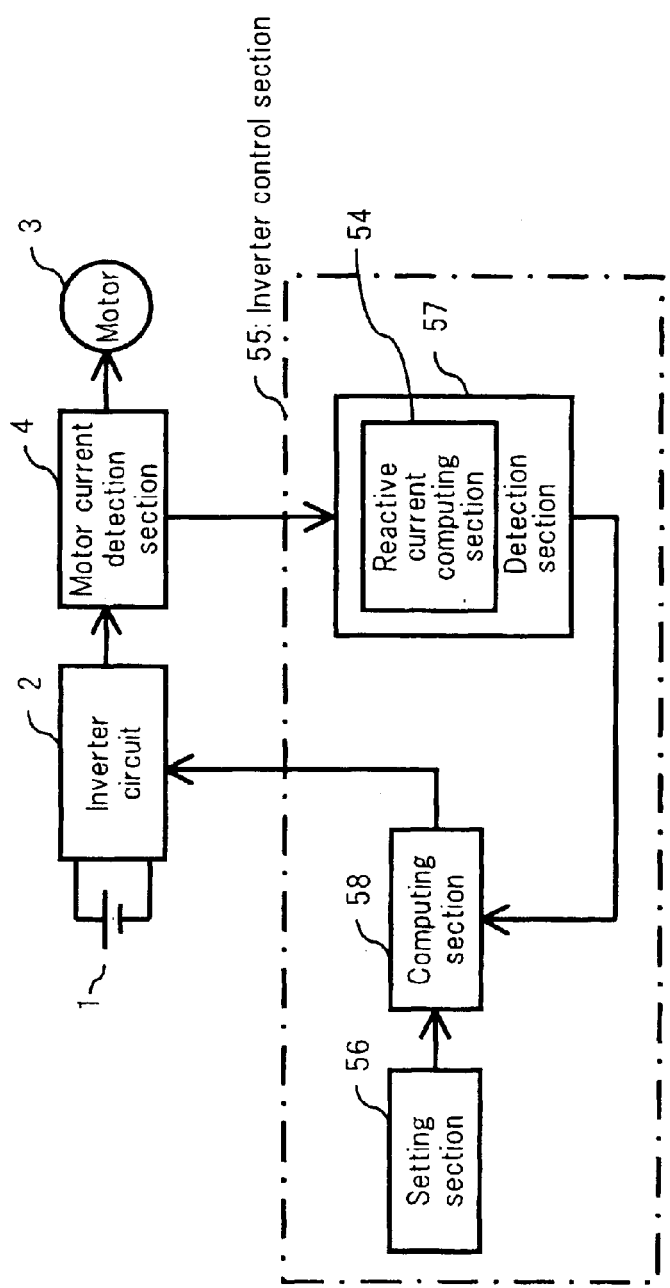
[FIG. 1]

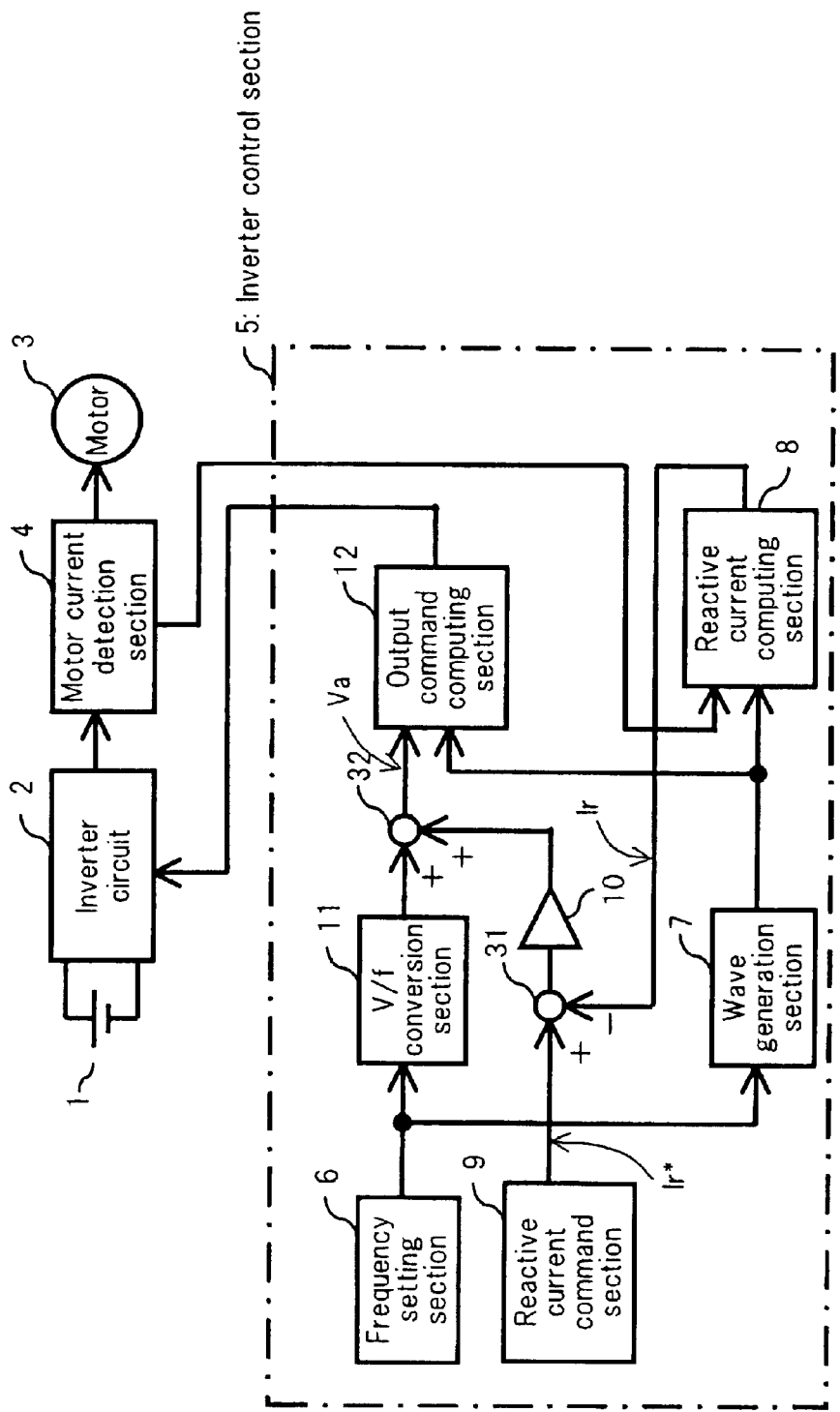
[FIG. 2]

[FIG. 3]
(a) 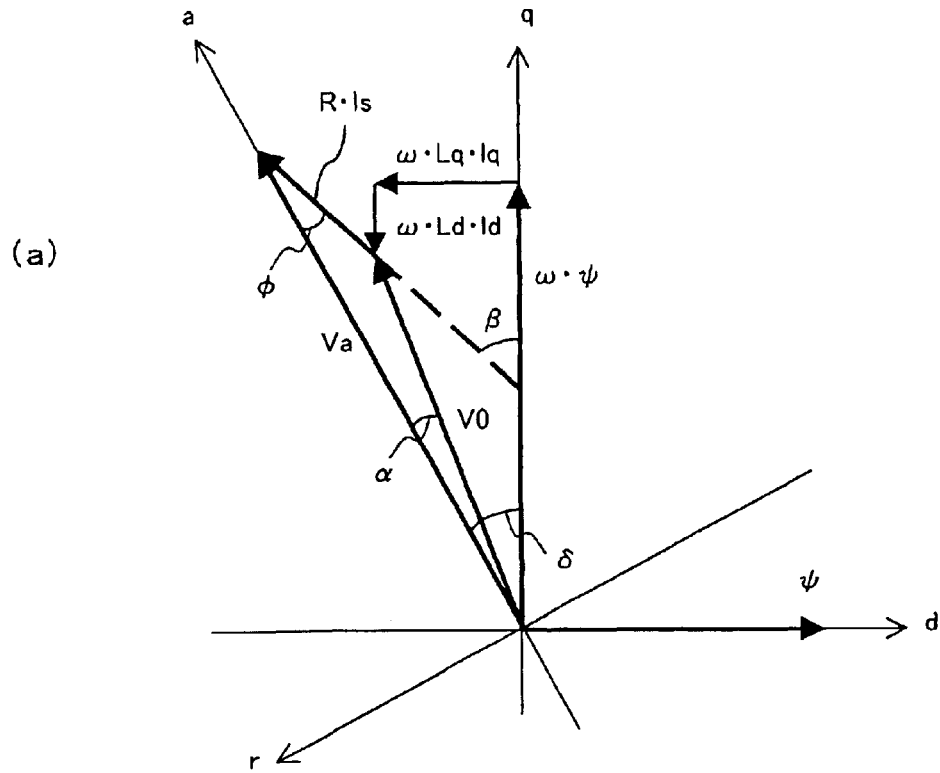
(b) 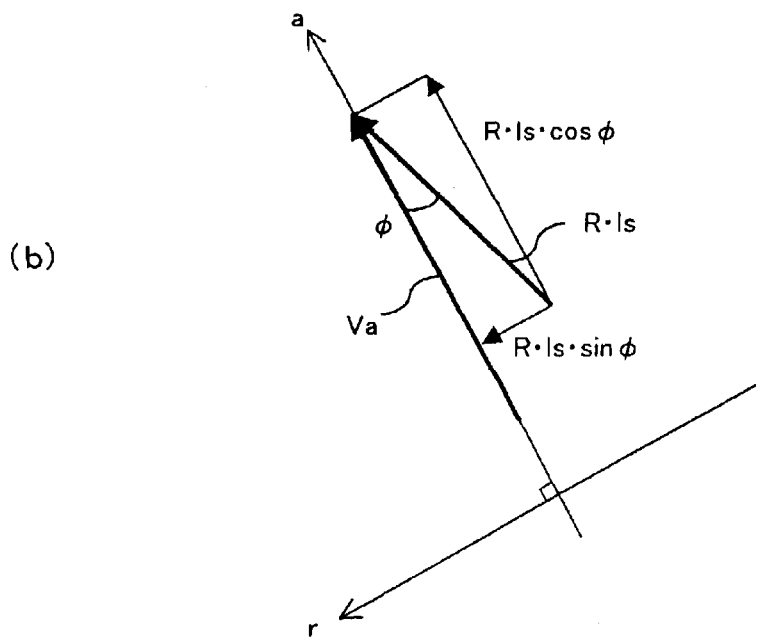

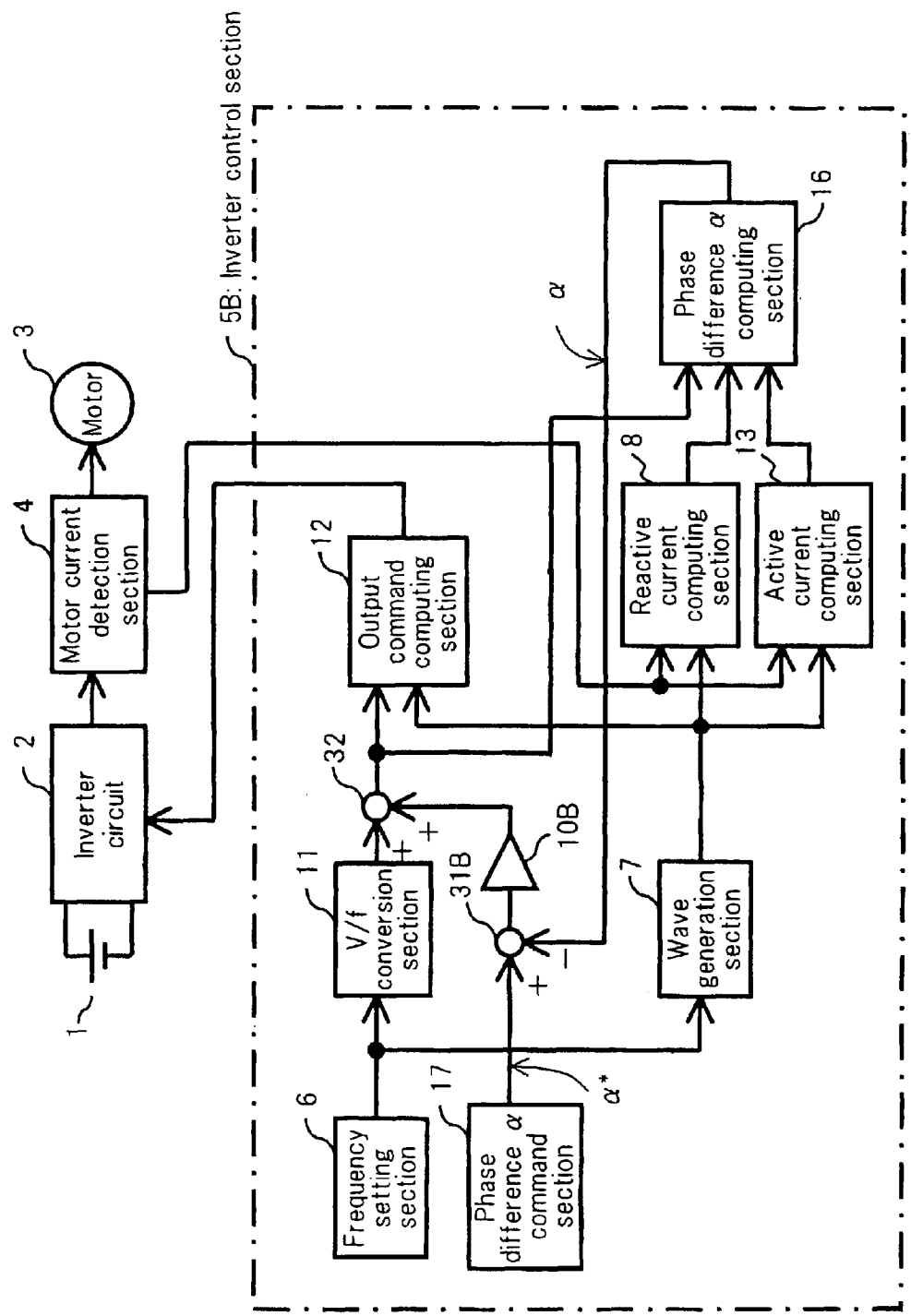
[FIG. 5]

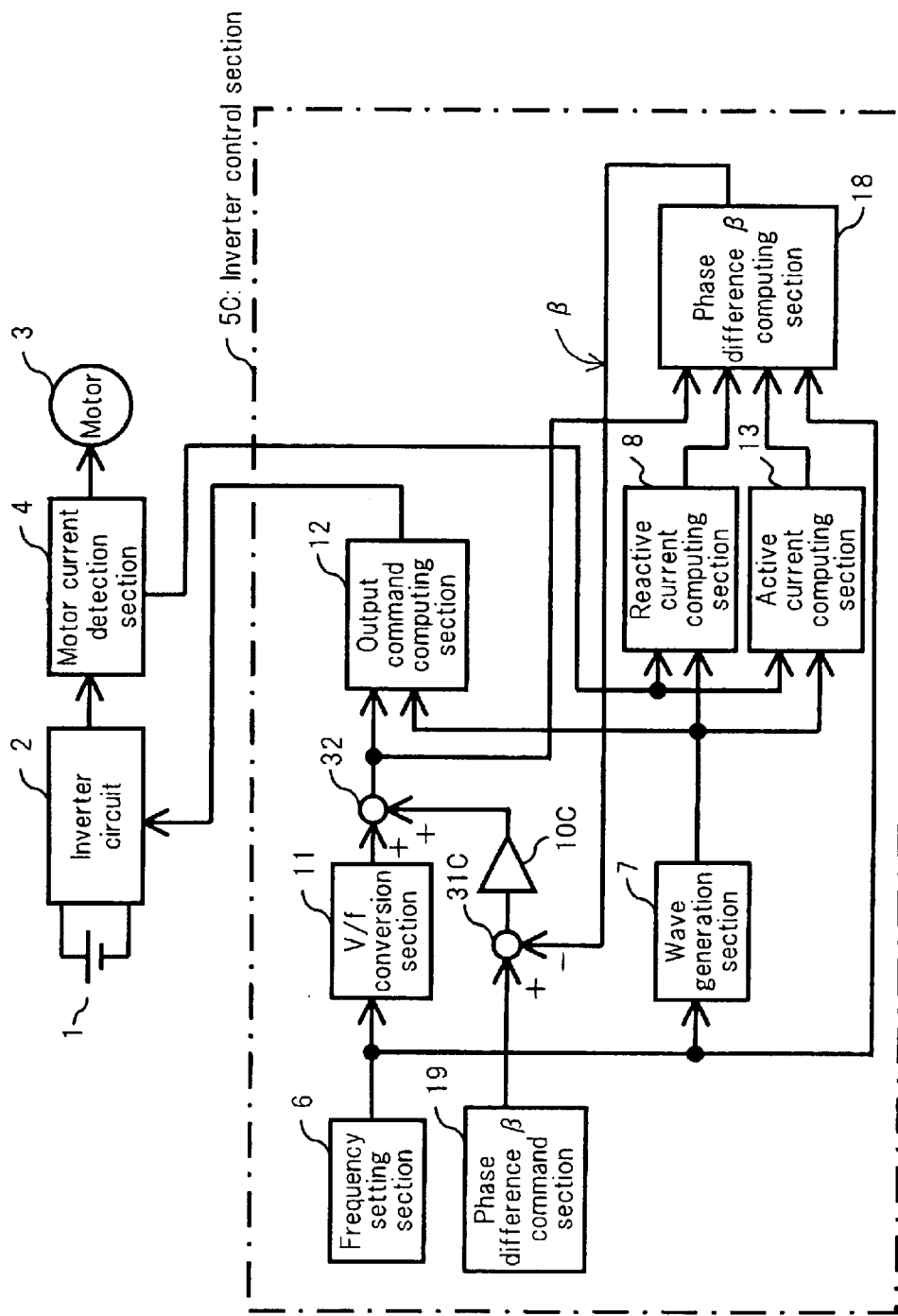
[FIG. 6]

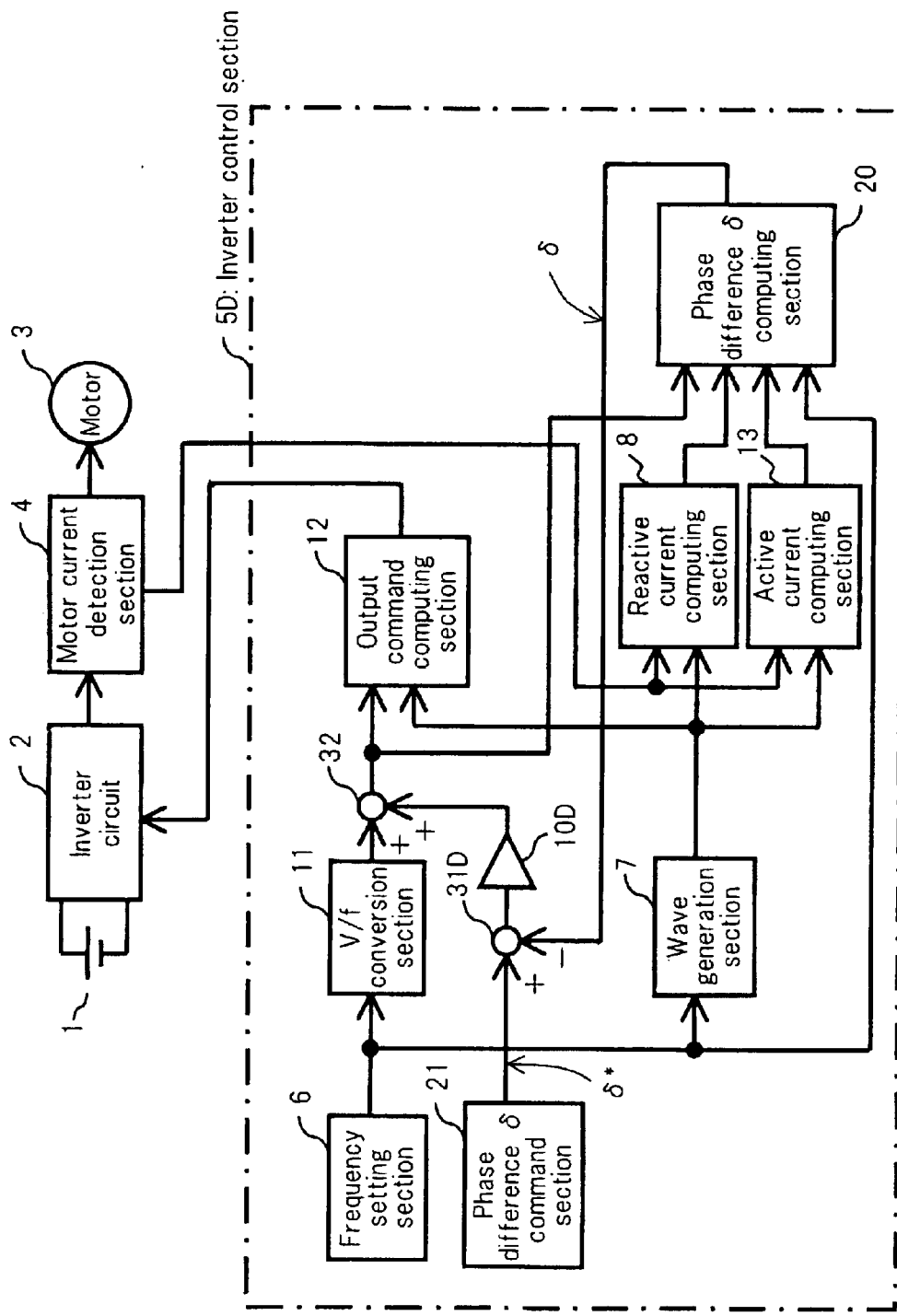
[FIG. 7]

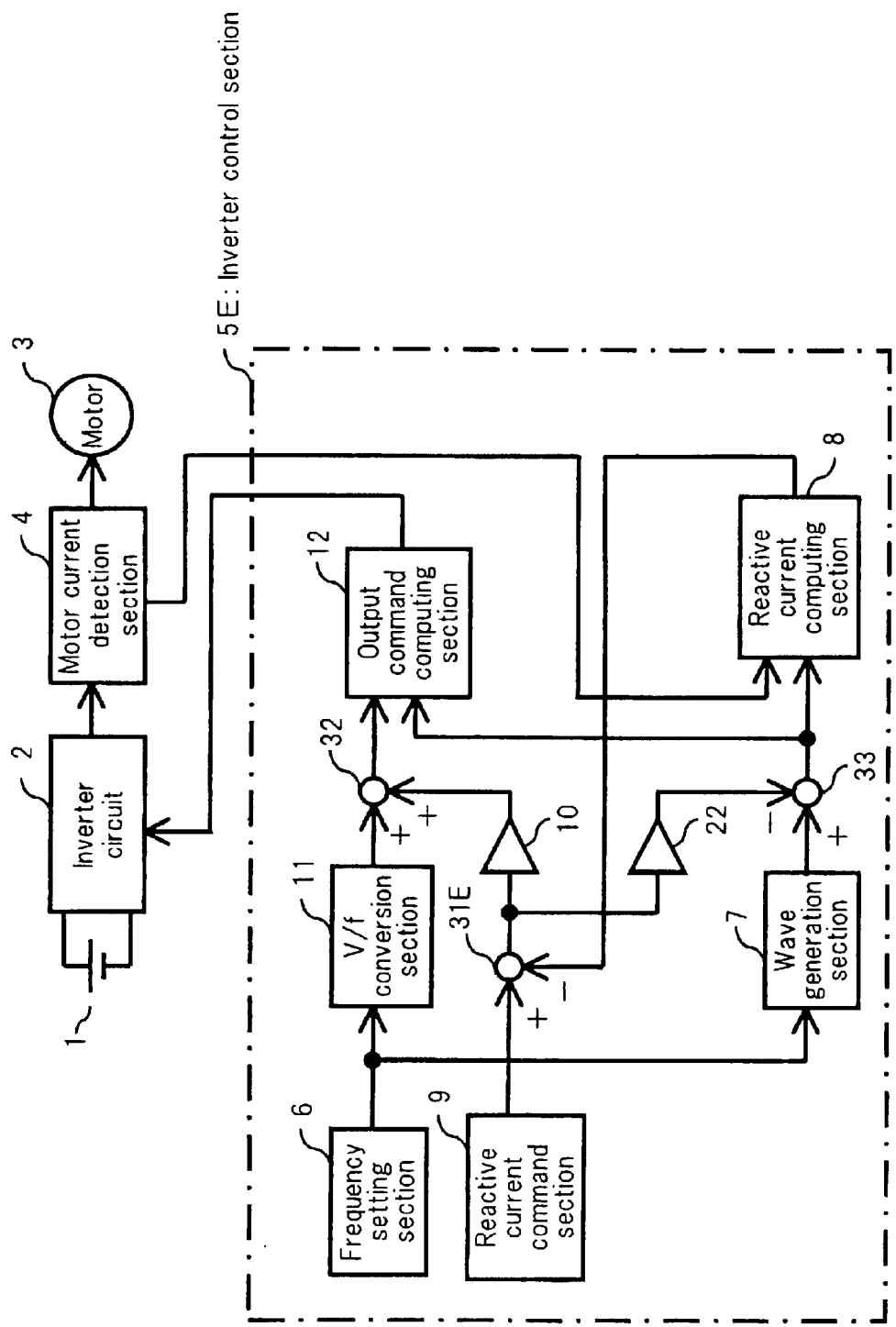
[FIG. 8]

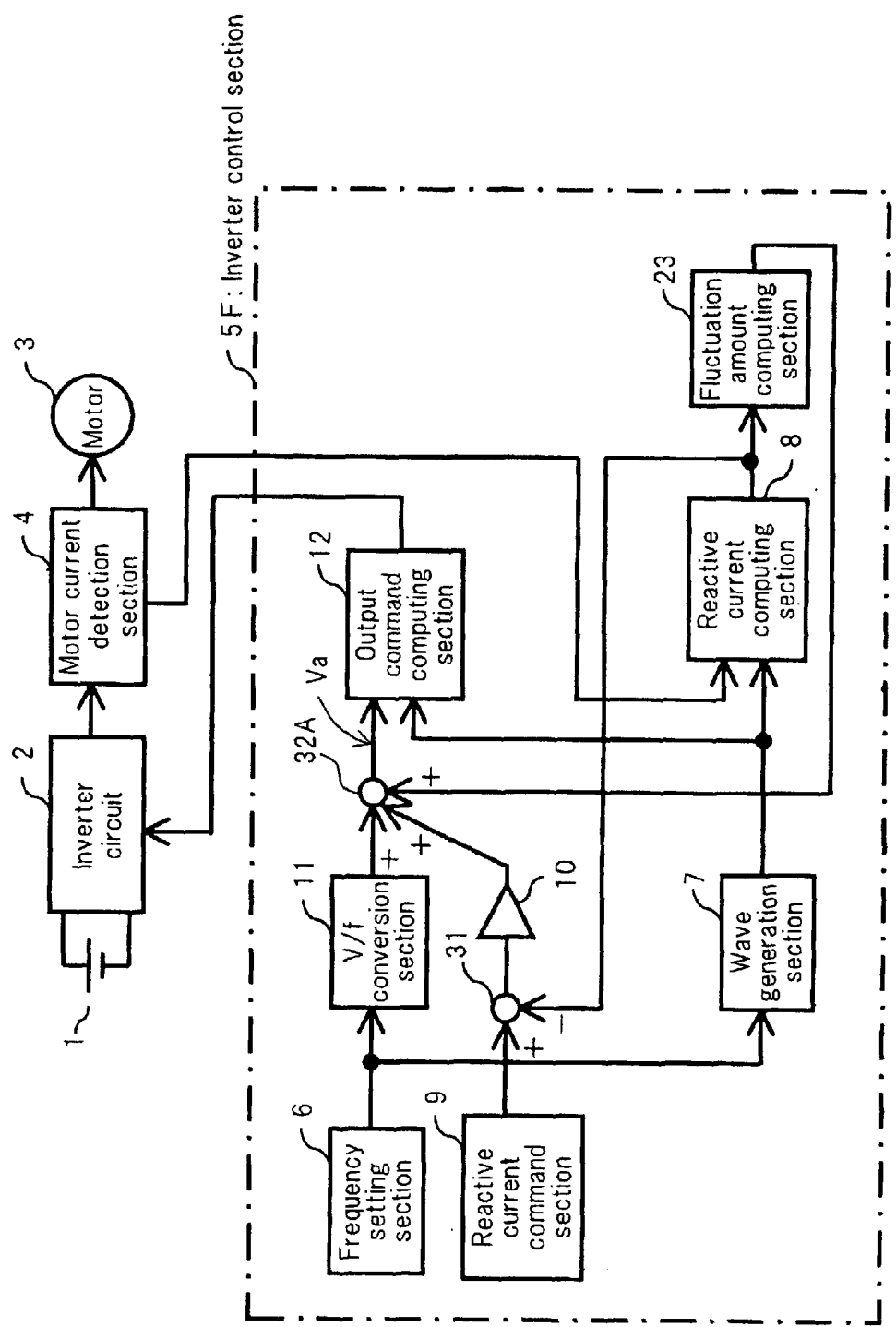
[FIG. 9]

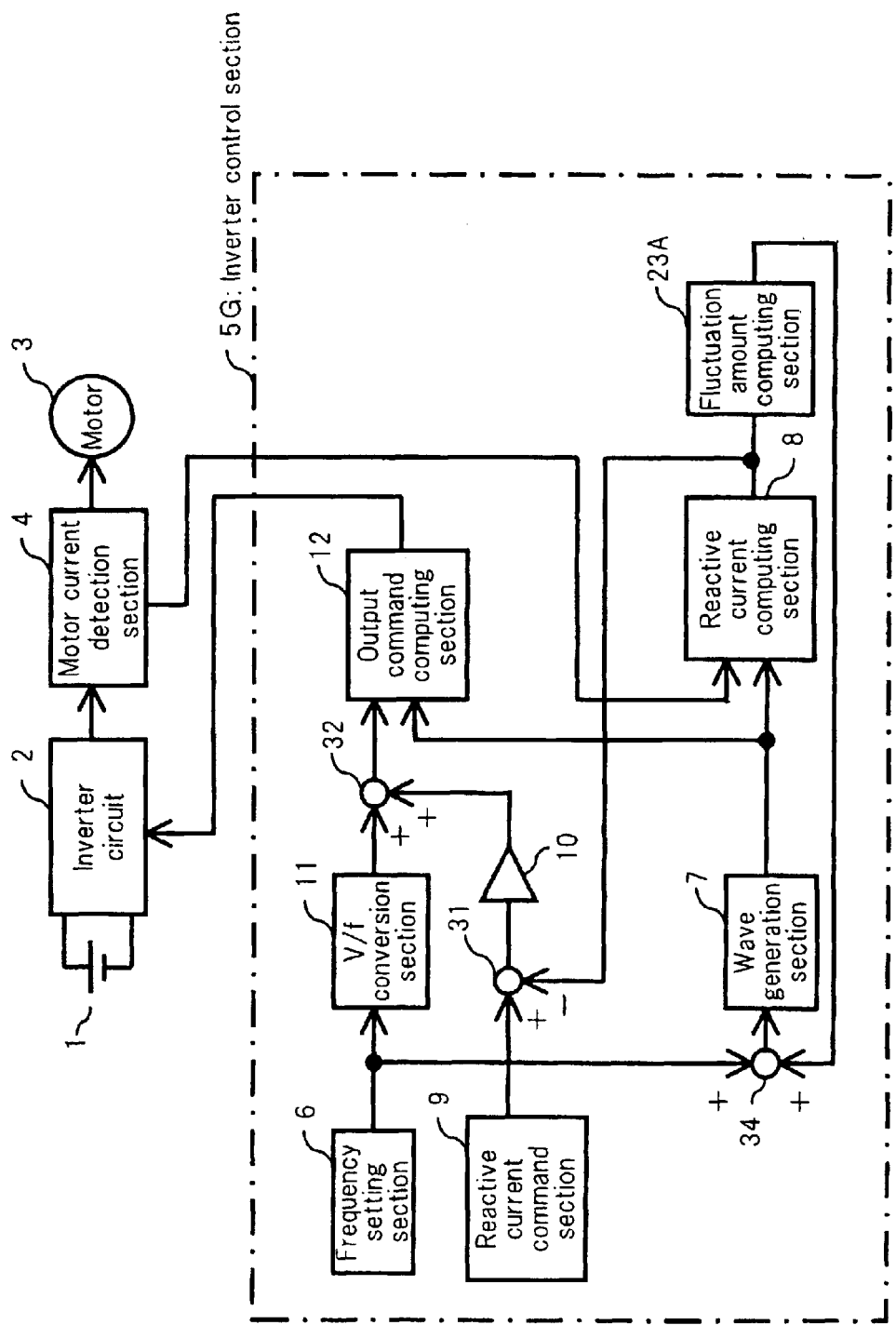
[FIG. 10]

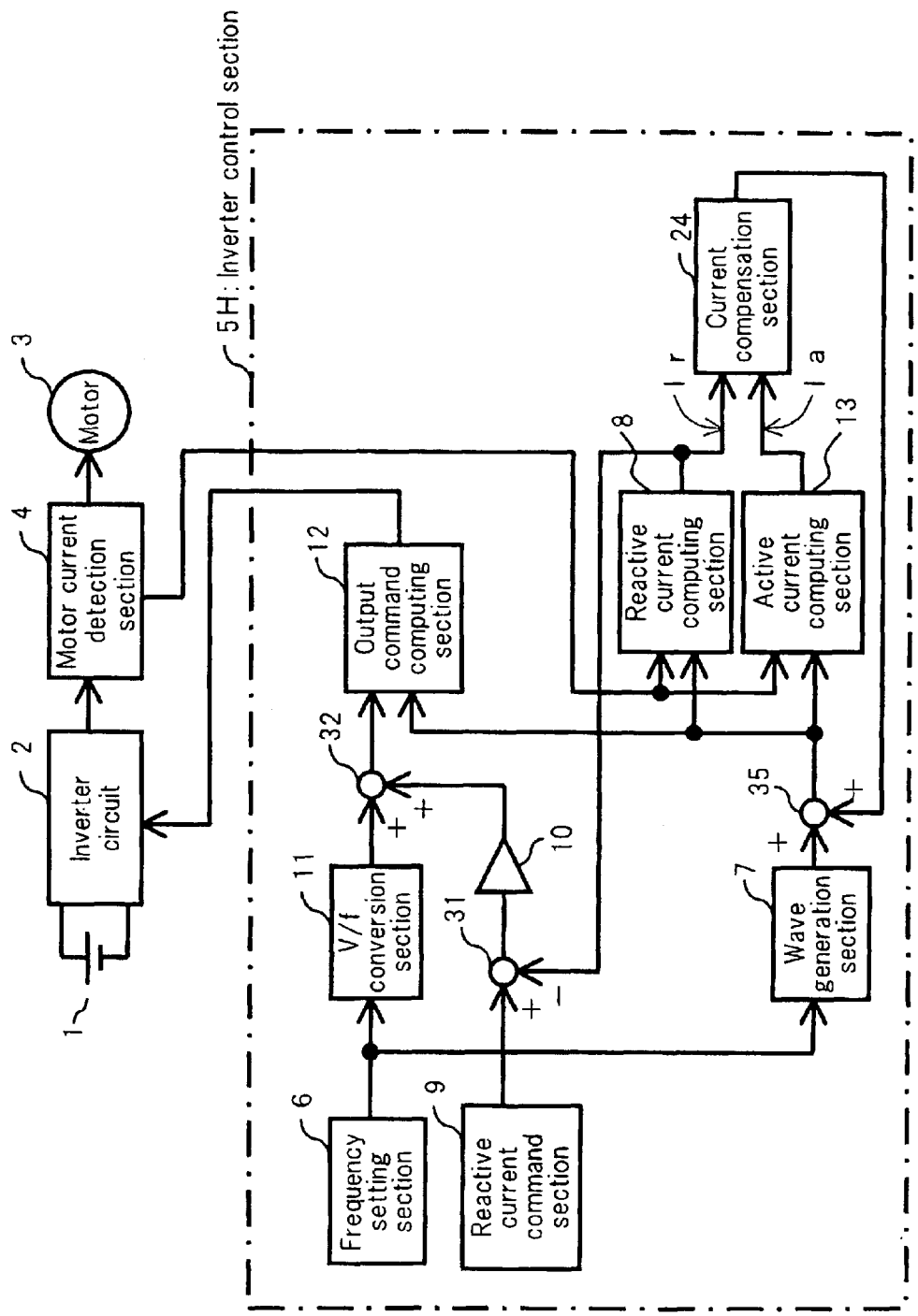
[FIG. 11]

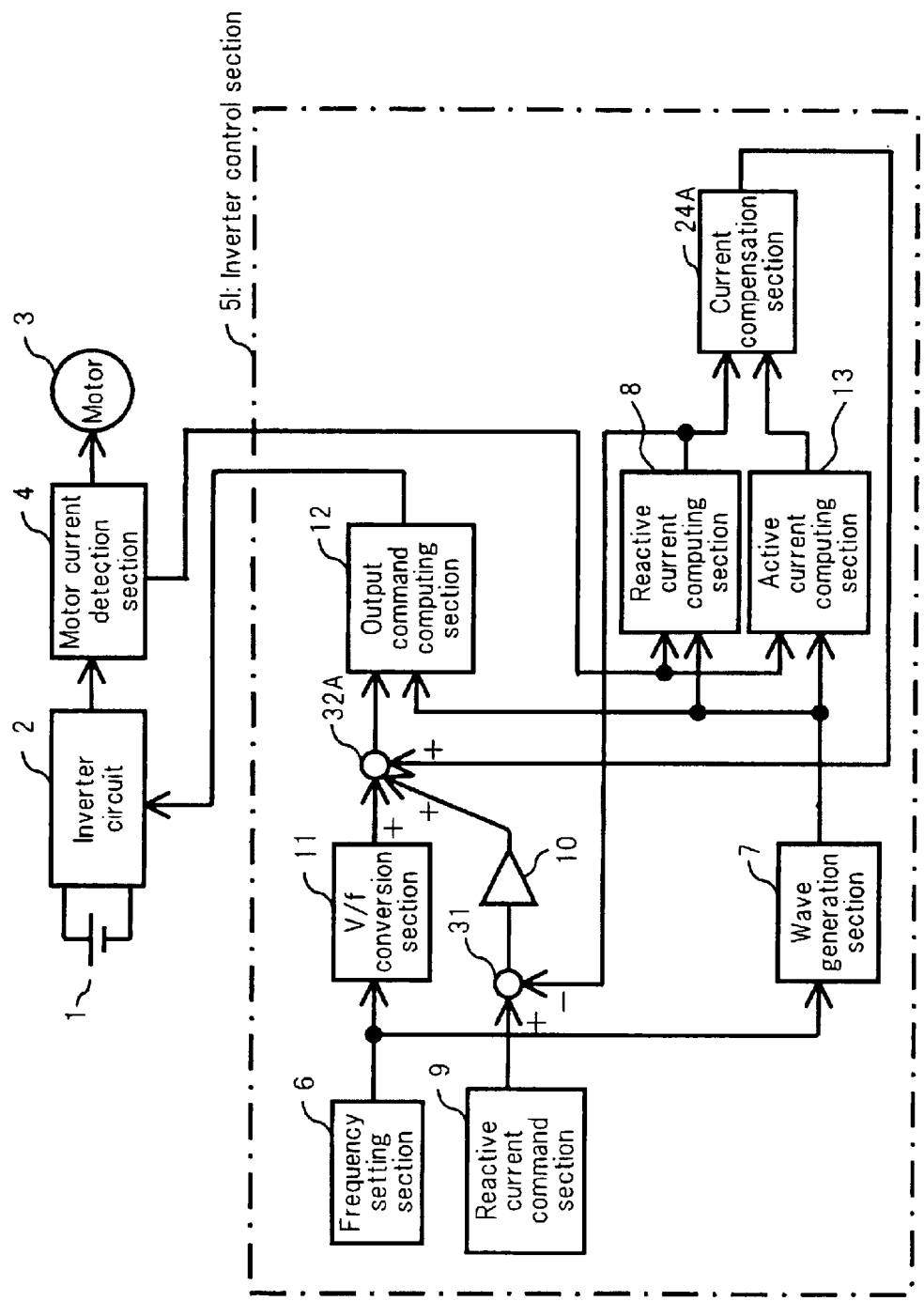
[FIG. 12]

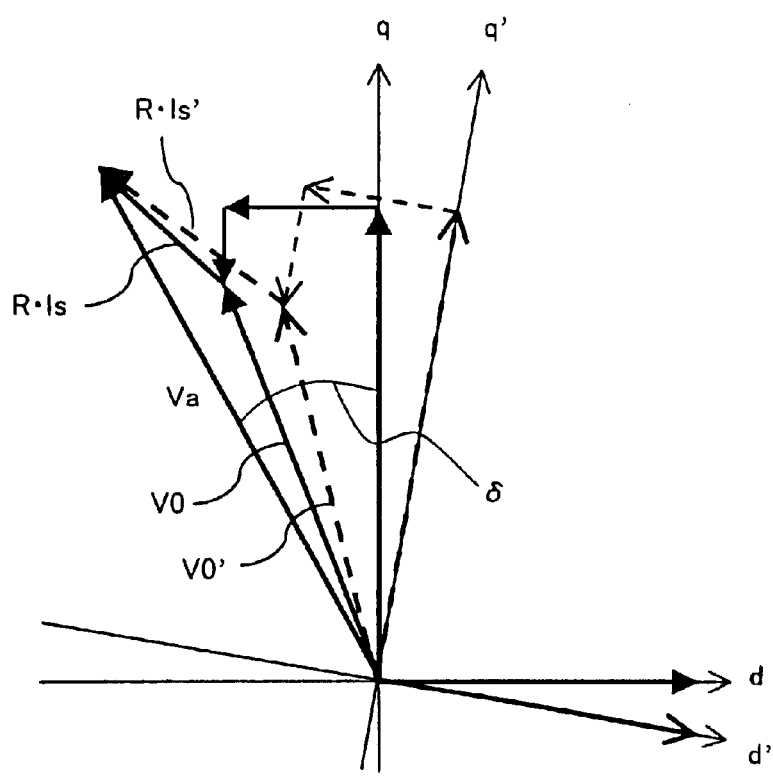
[FIG. 13]

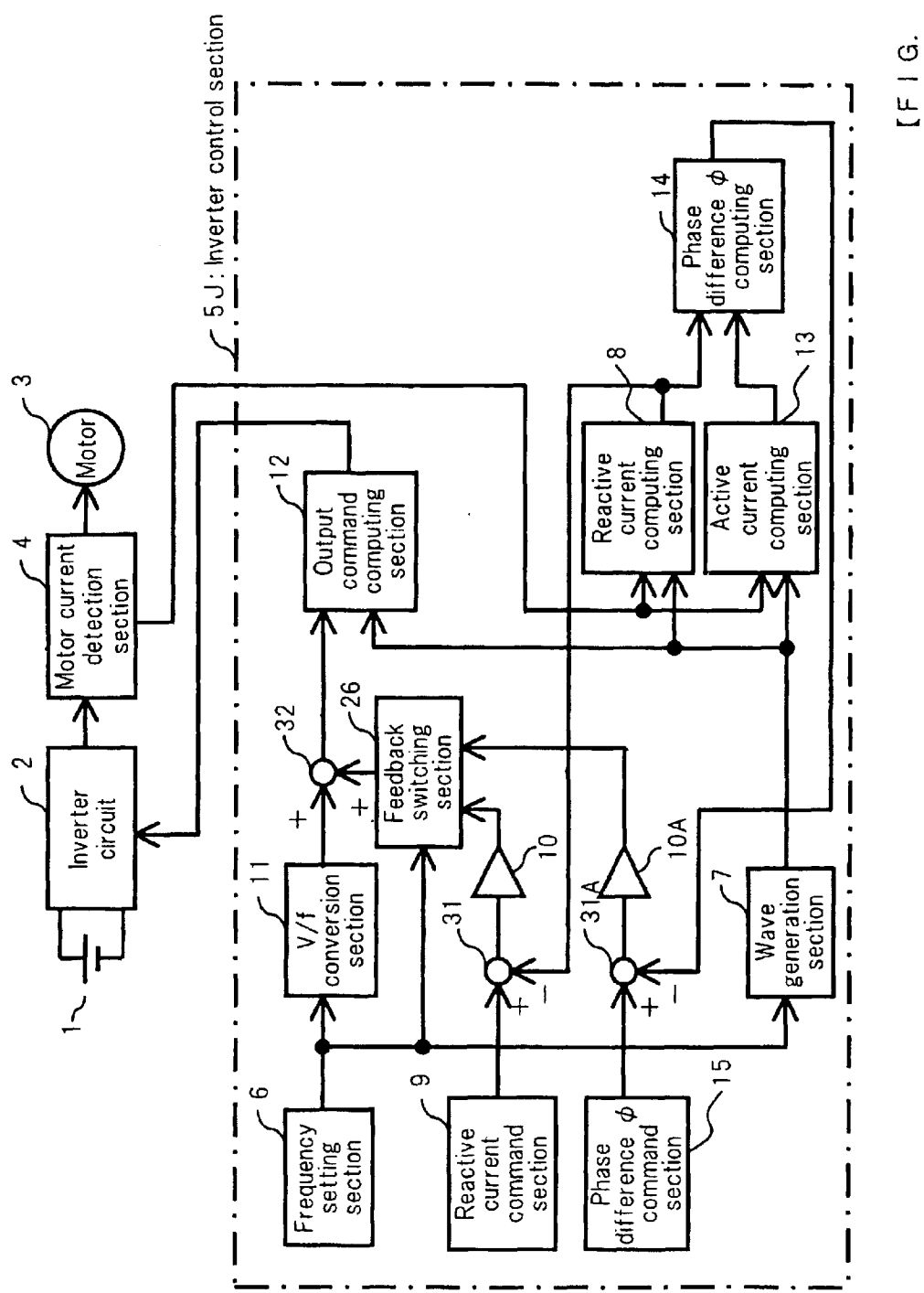
[FIG. 14]

[FIG. 15]
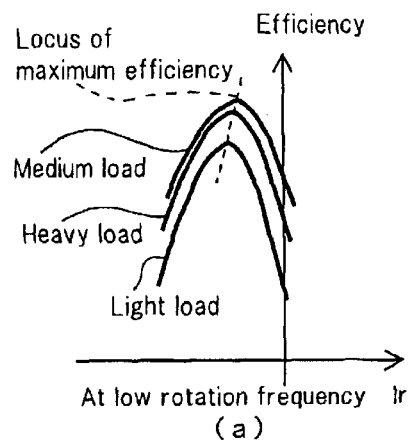
(a) At low rotation frequency
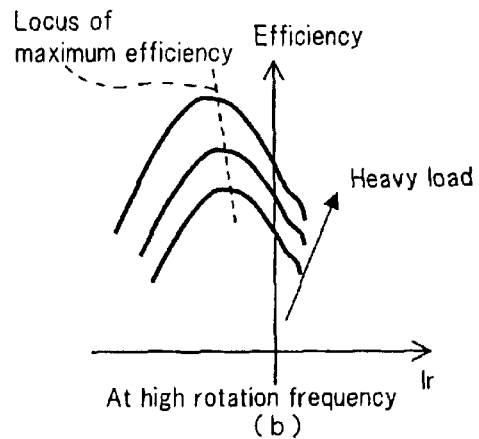
(b) At high rotation frequency
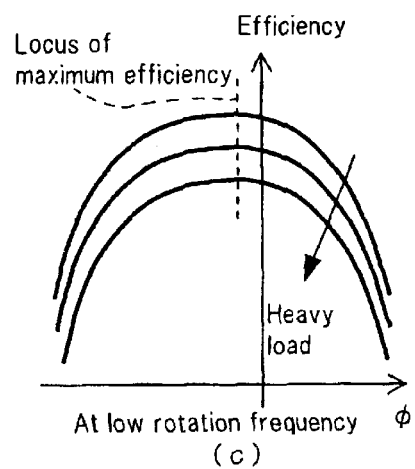
(c) At low rotation frequency
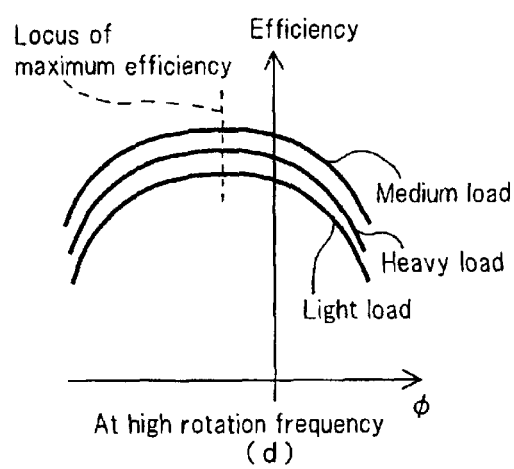
(d) At high rotation frequency
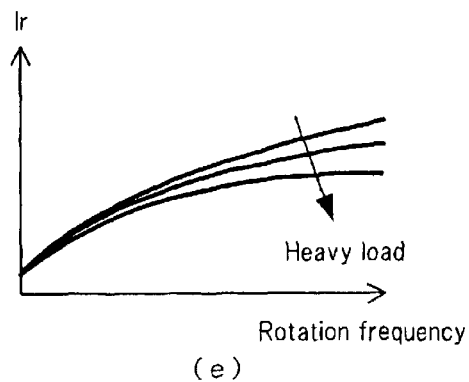
(e)
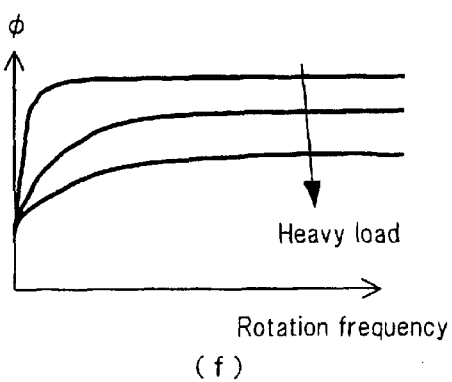
(f)

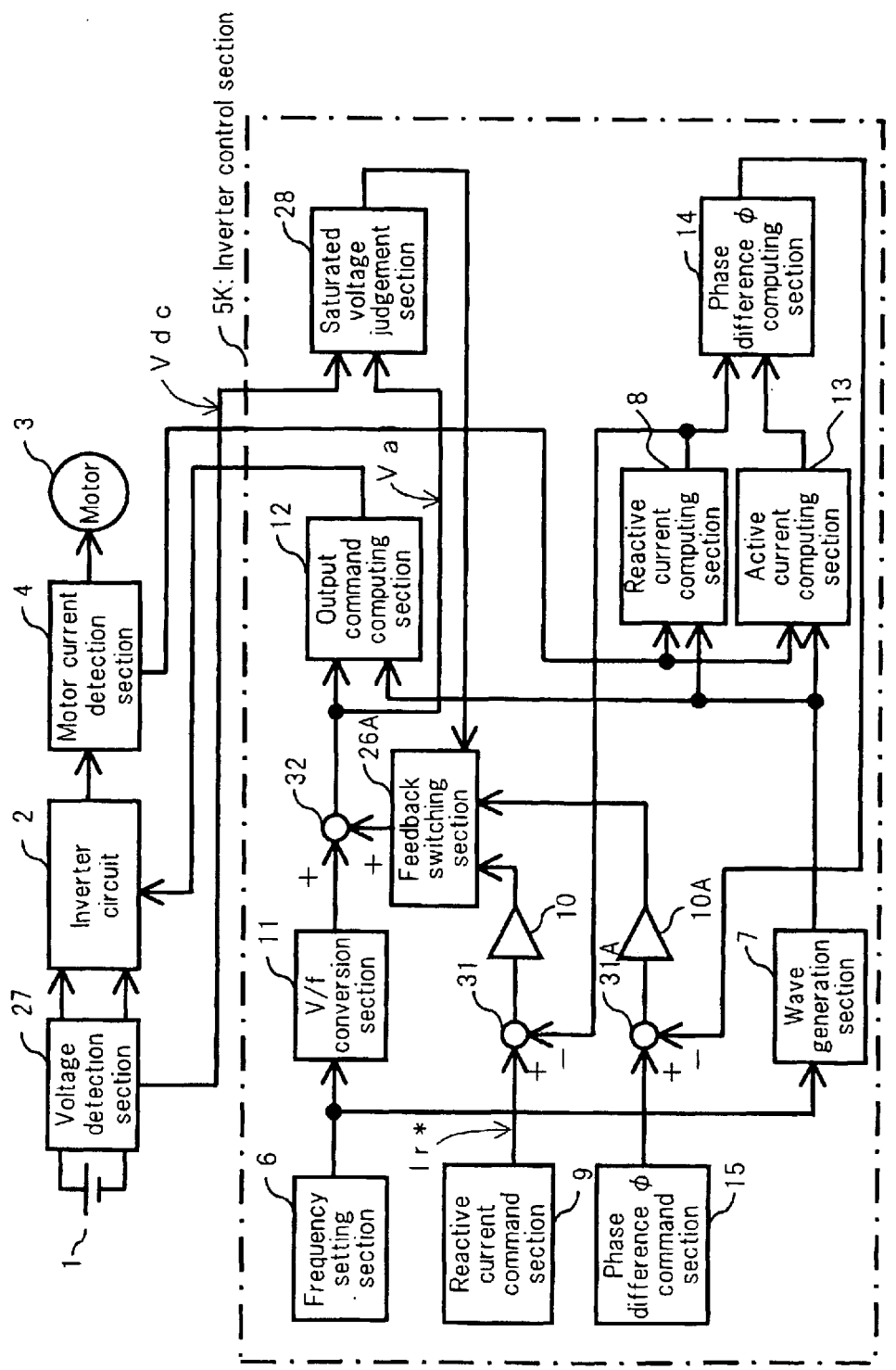
[FIG. 16]

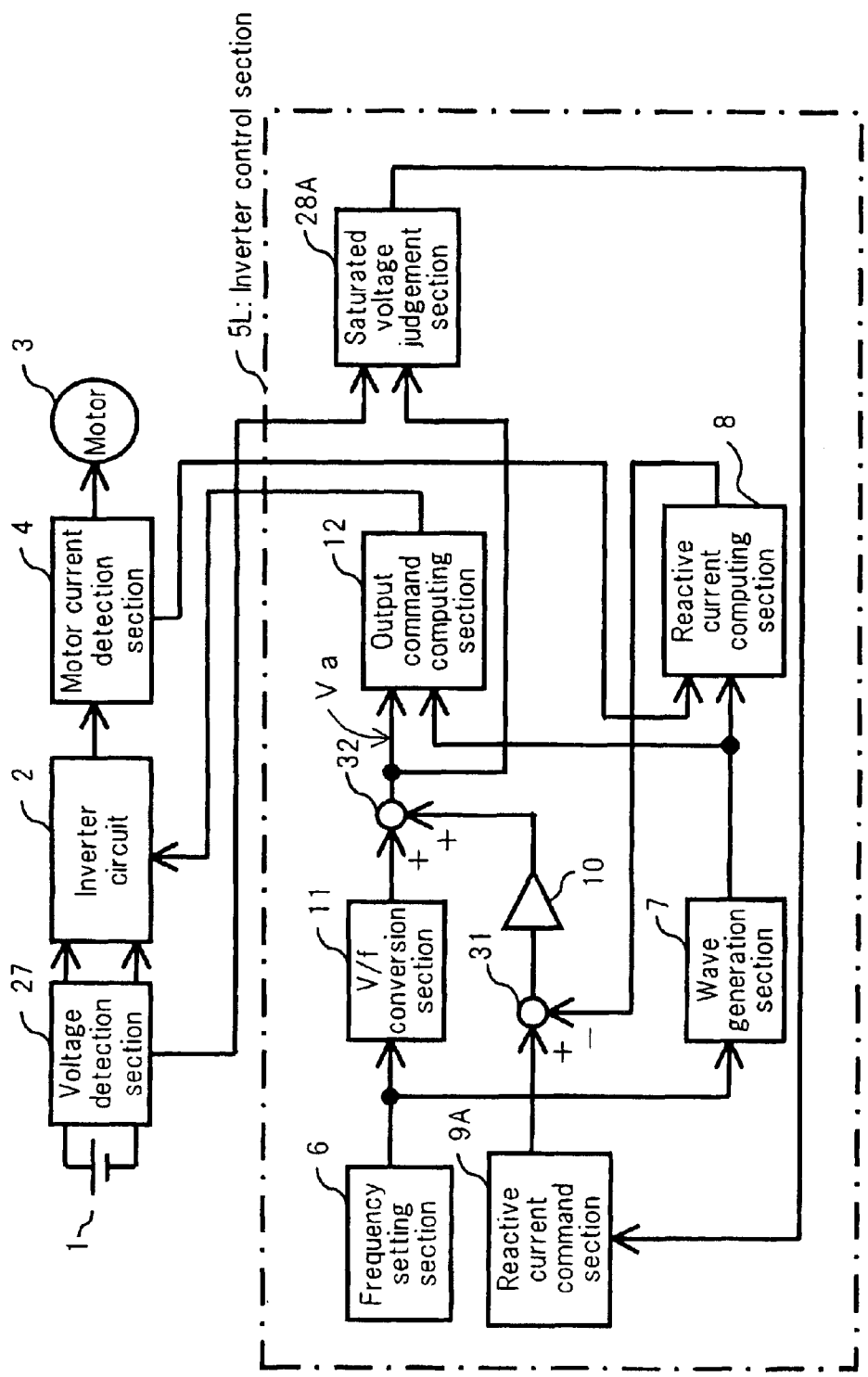
[FIG. 17]

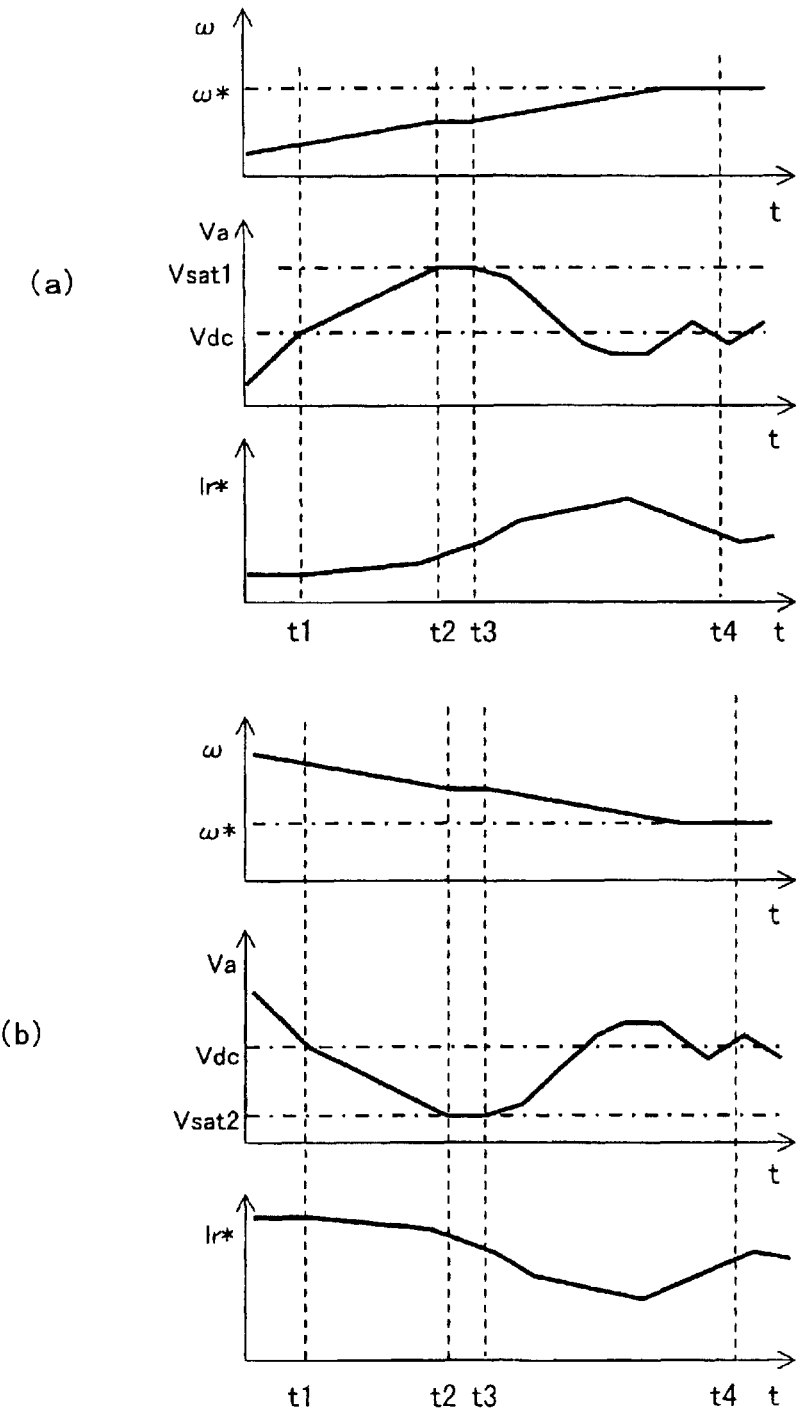
[FIG. 18]

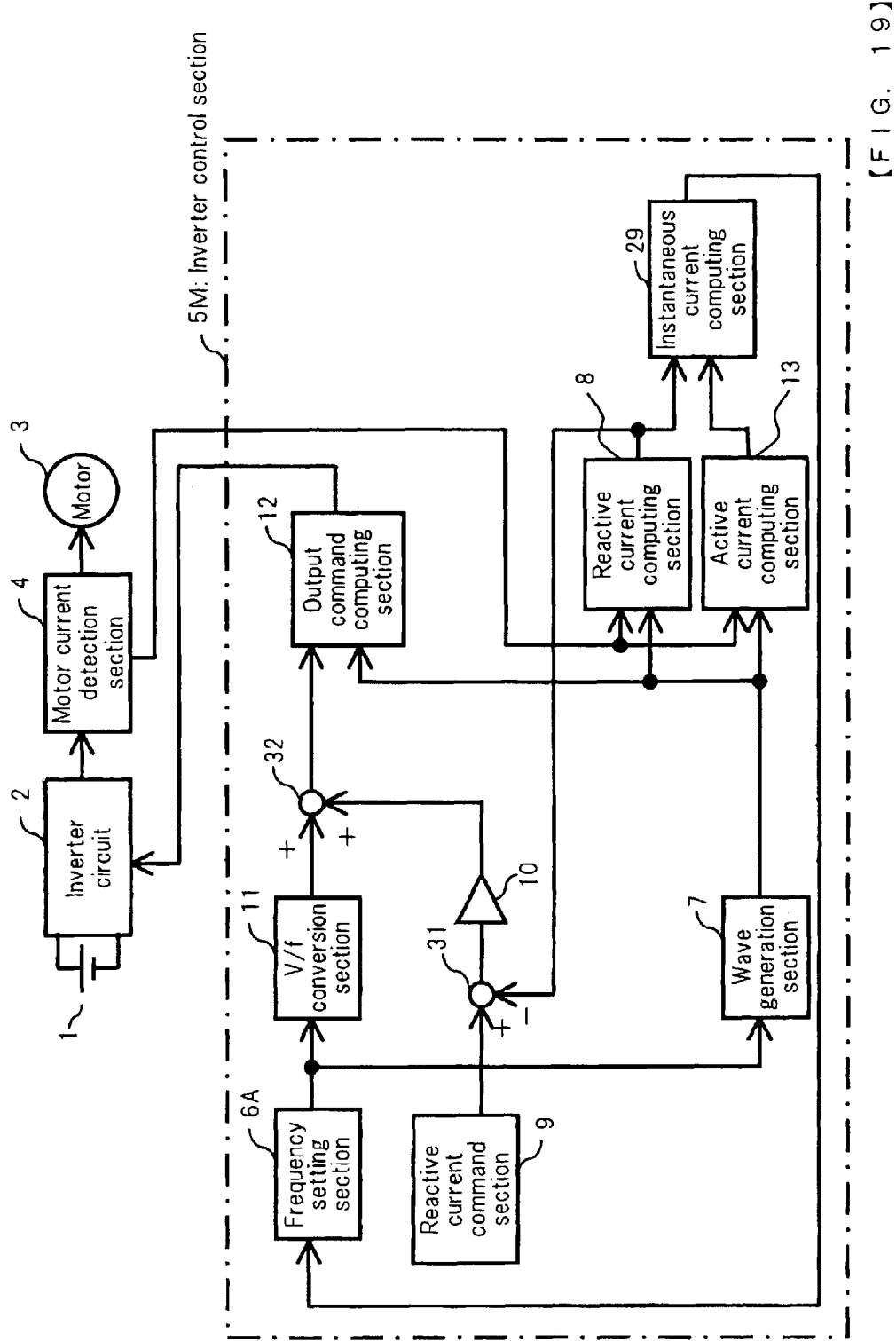

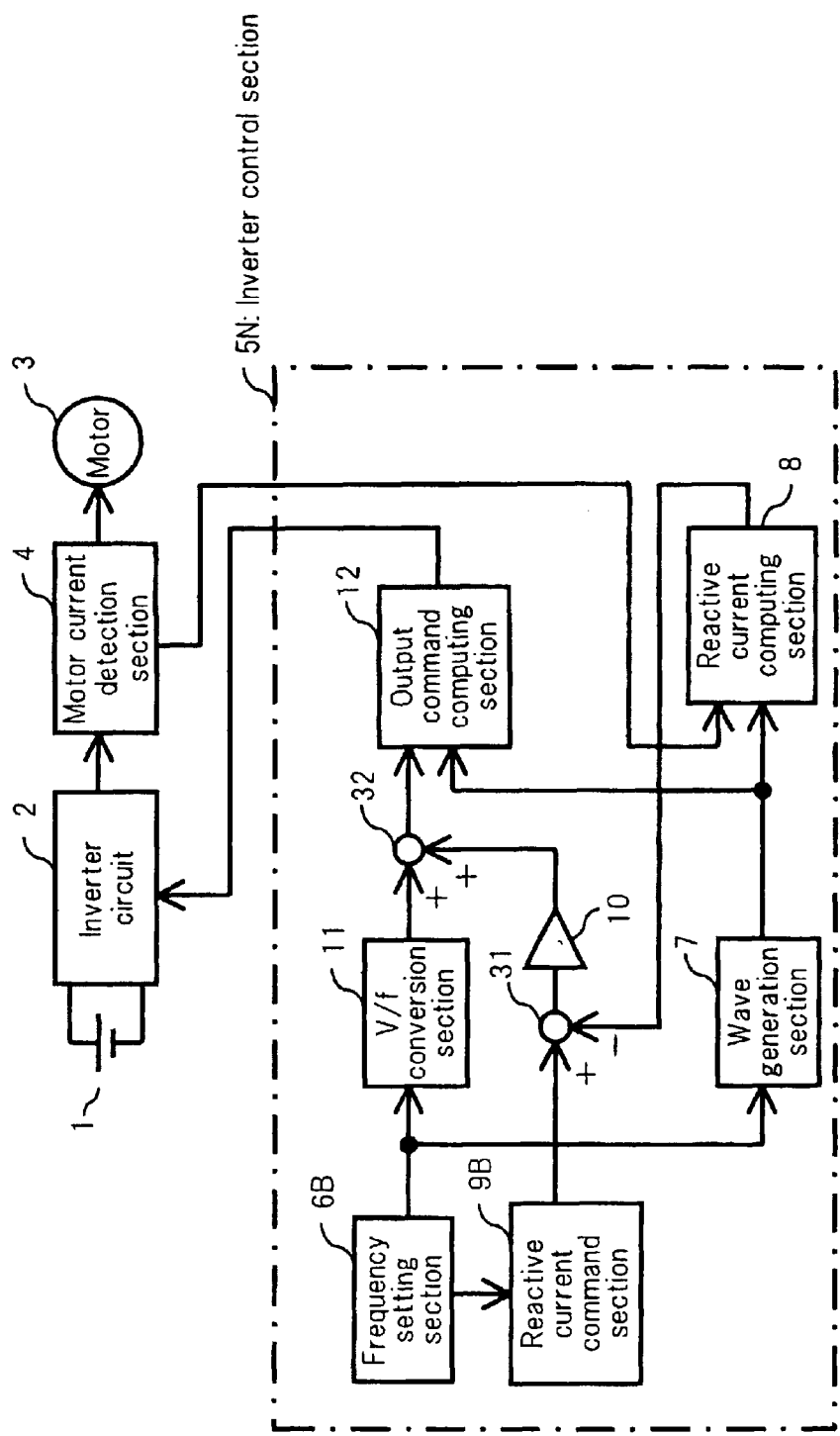
[FIG. 20]

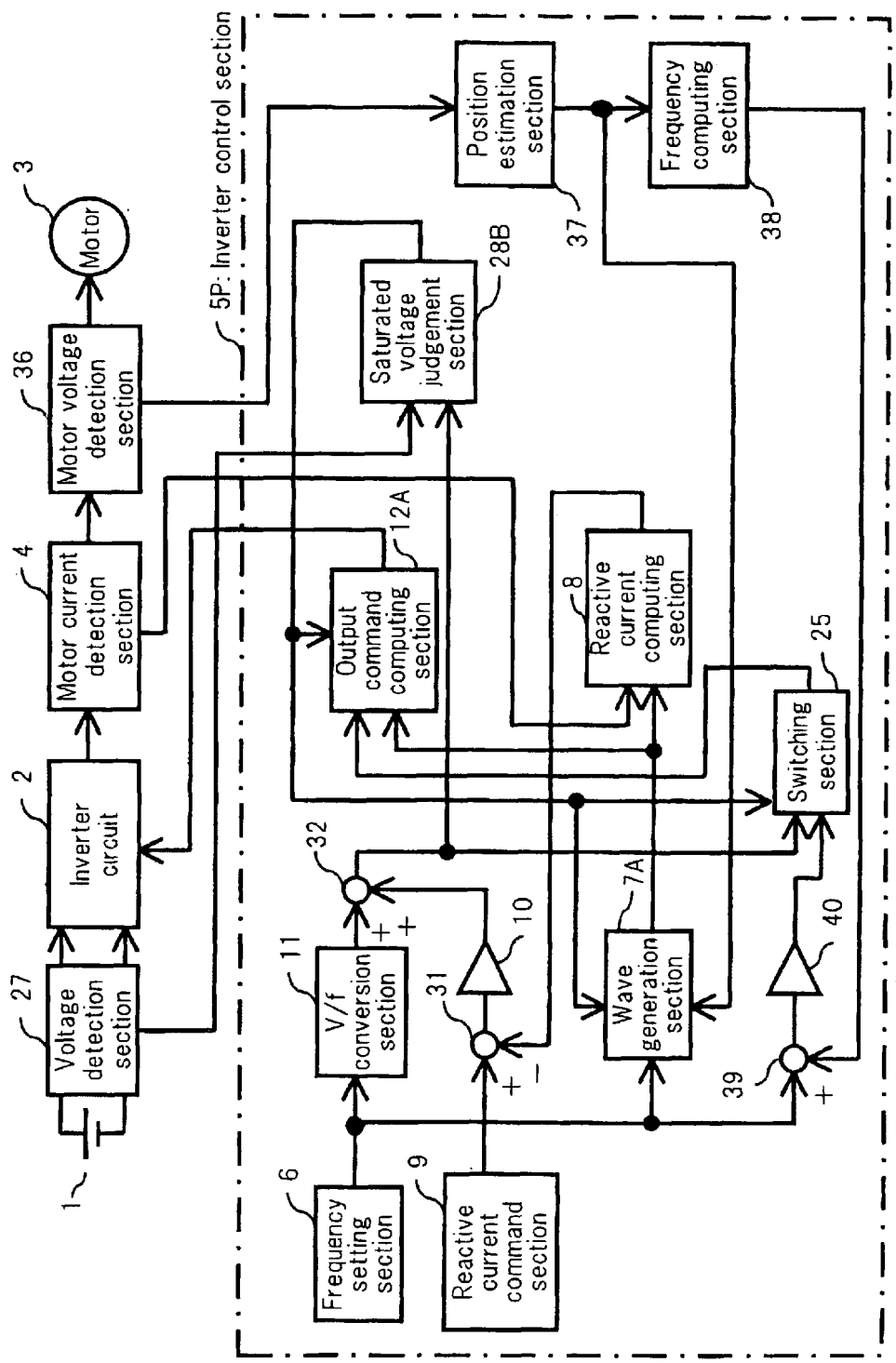
[FIG. 21]

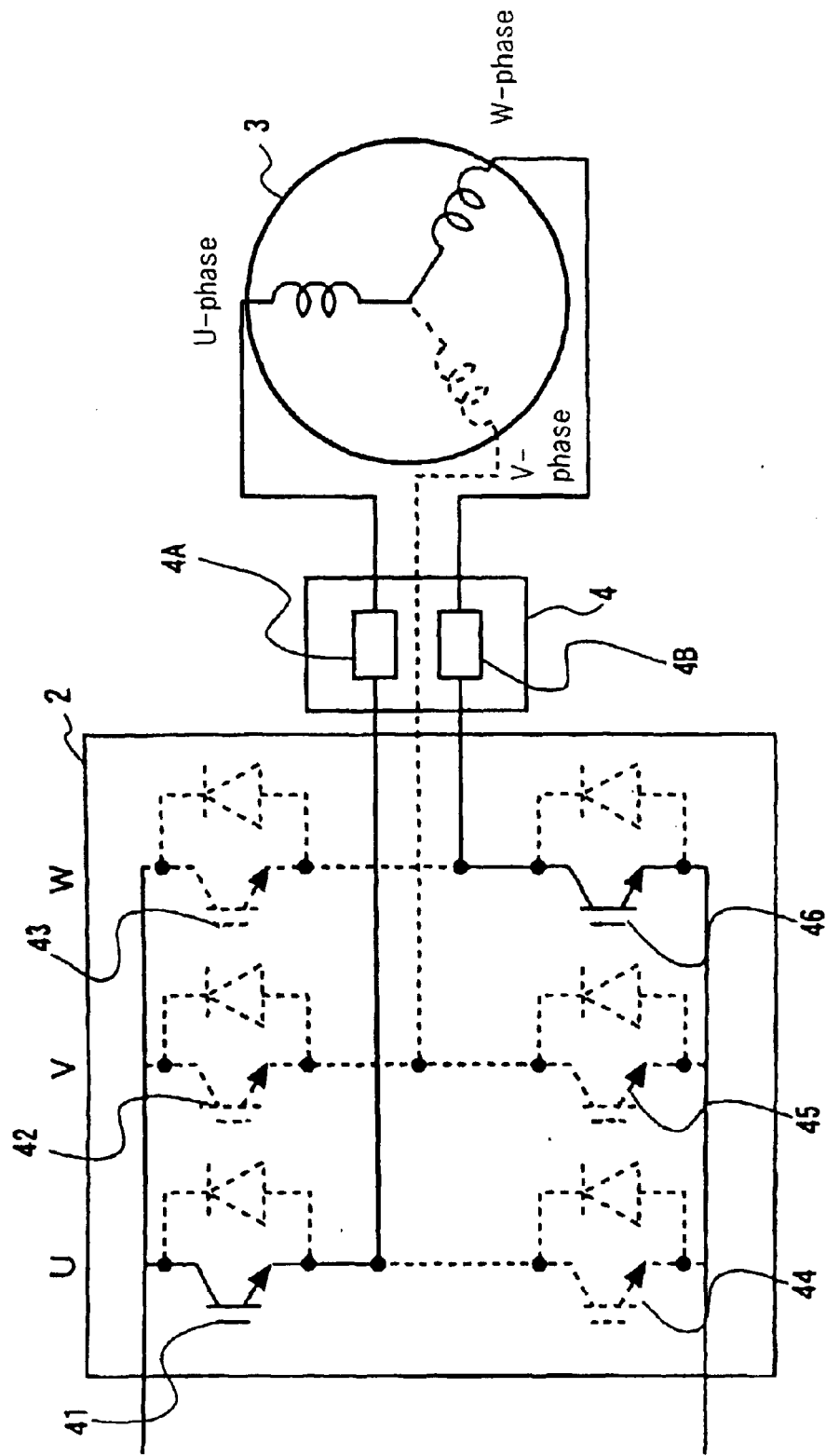
[FIG. 22]

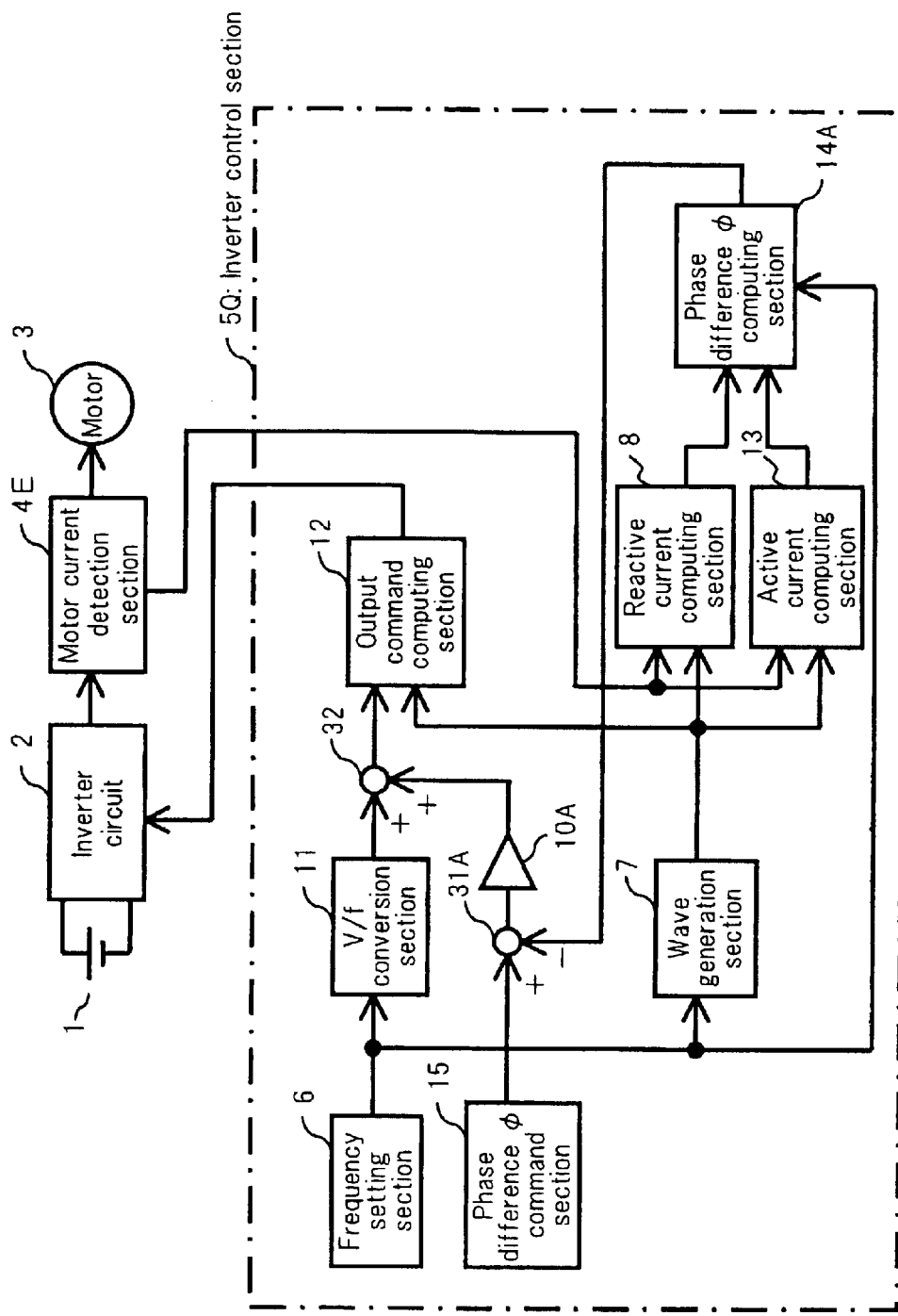
[ FIG. 23 ]

[FIG. 24]
(a)
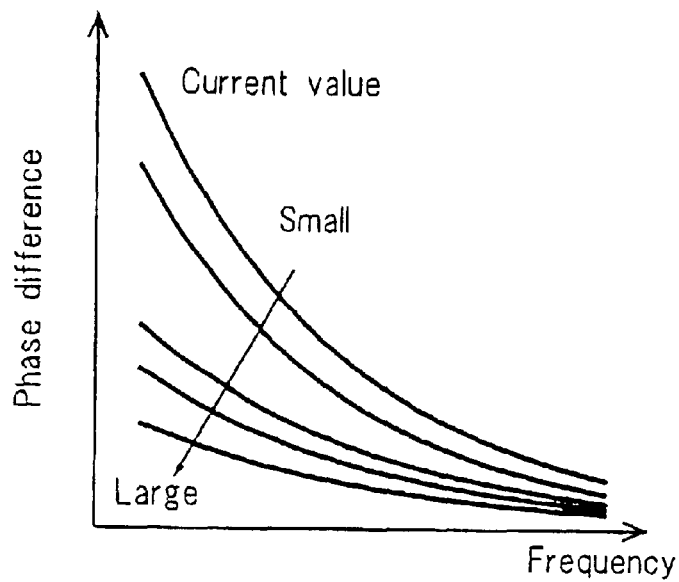
(b)
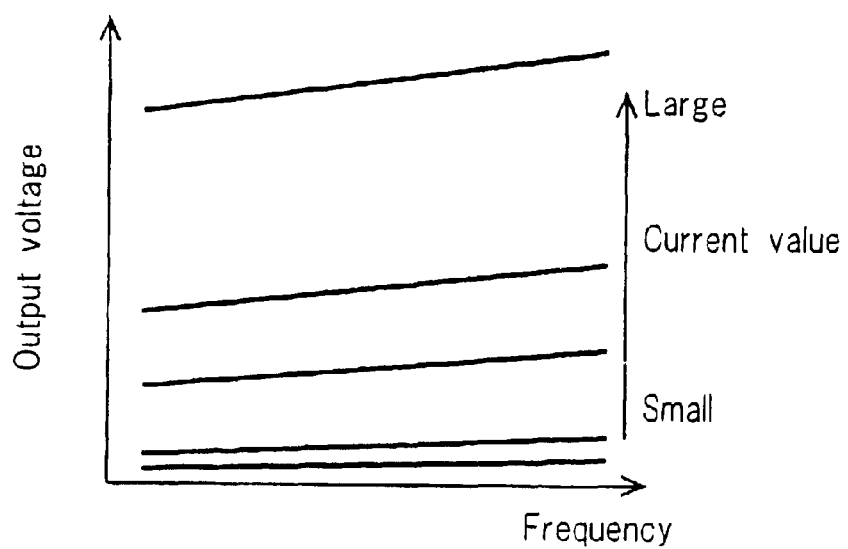

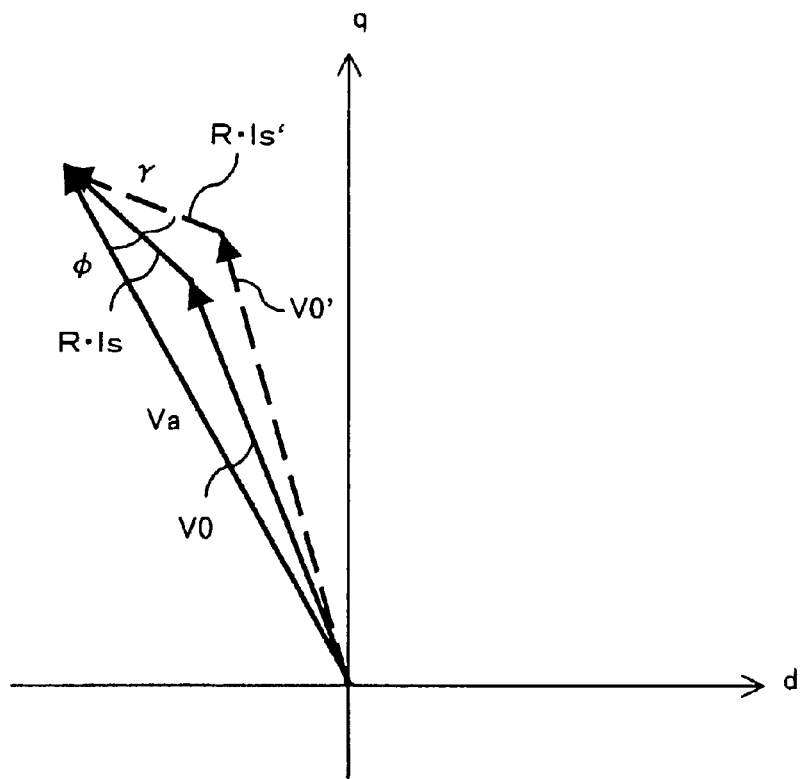
[FIG. 25]

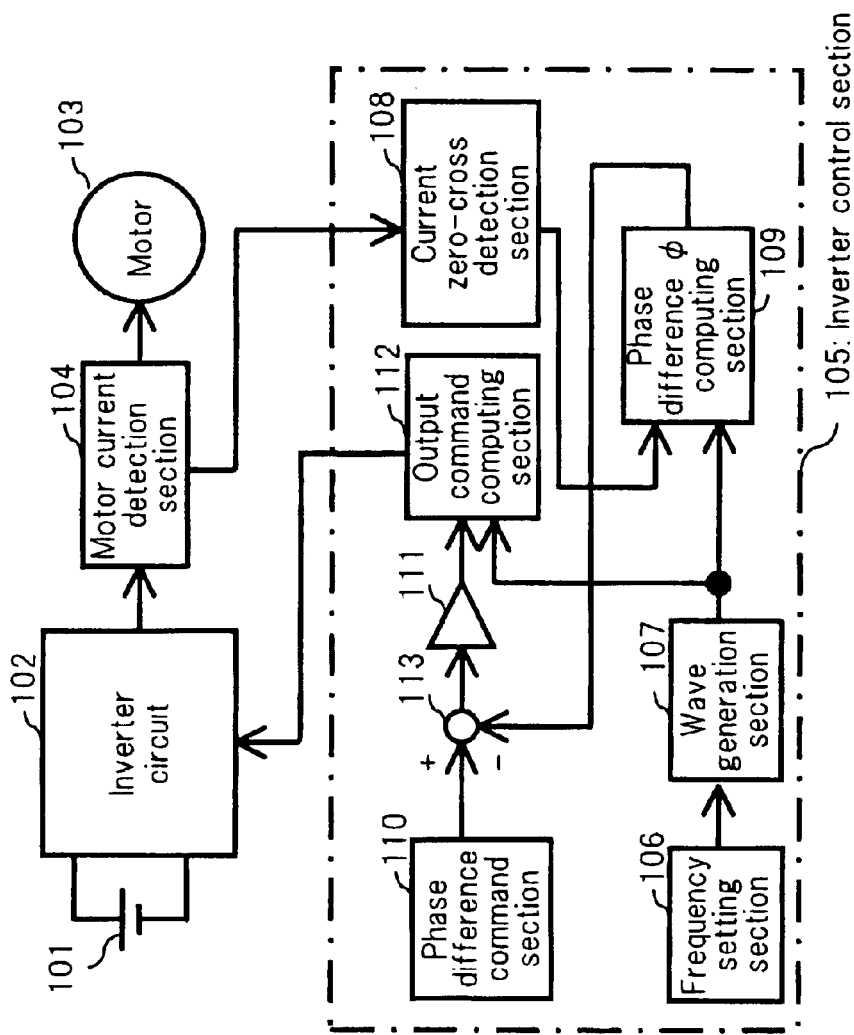
[FIG. 26]
(Prior art)

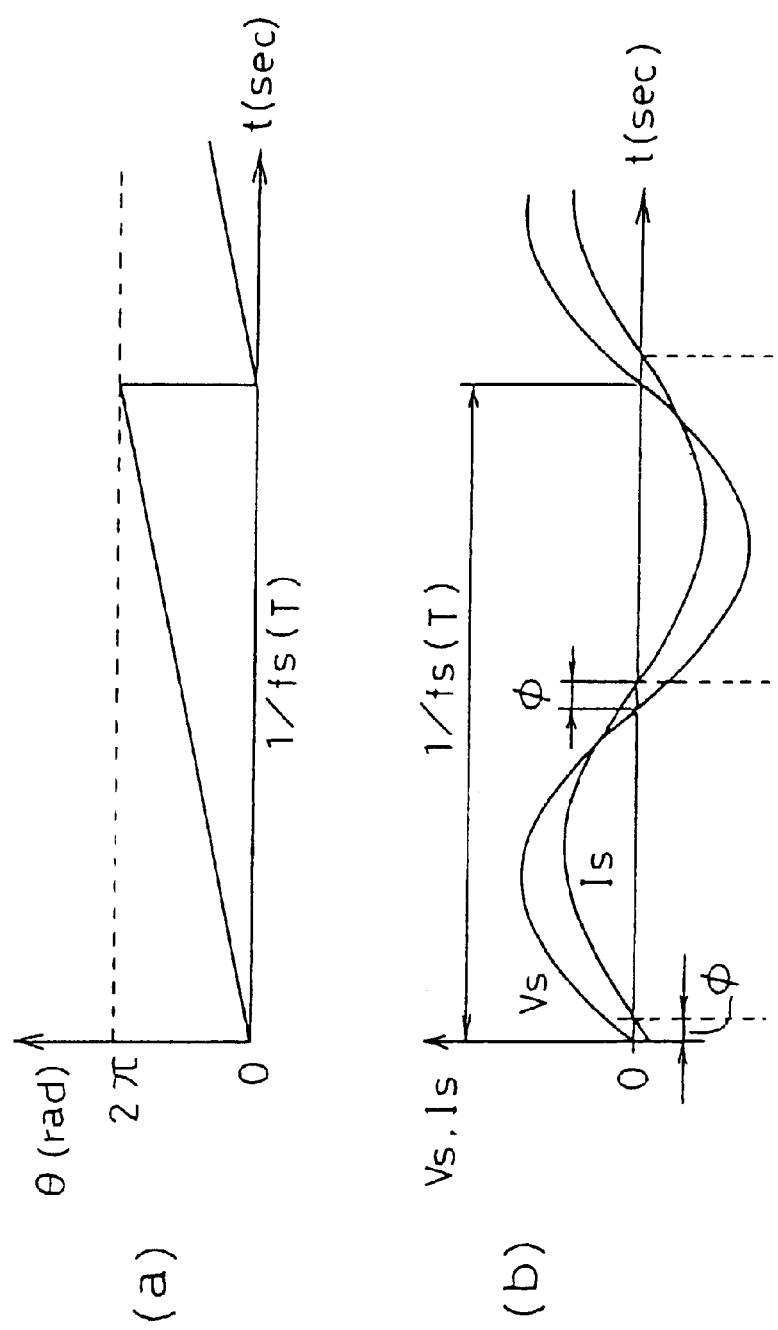
[FIG. 27]
(Prior art)

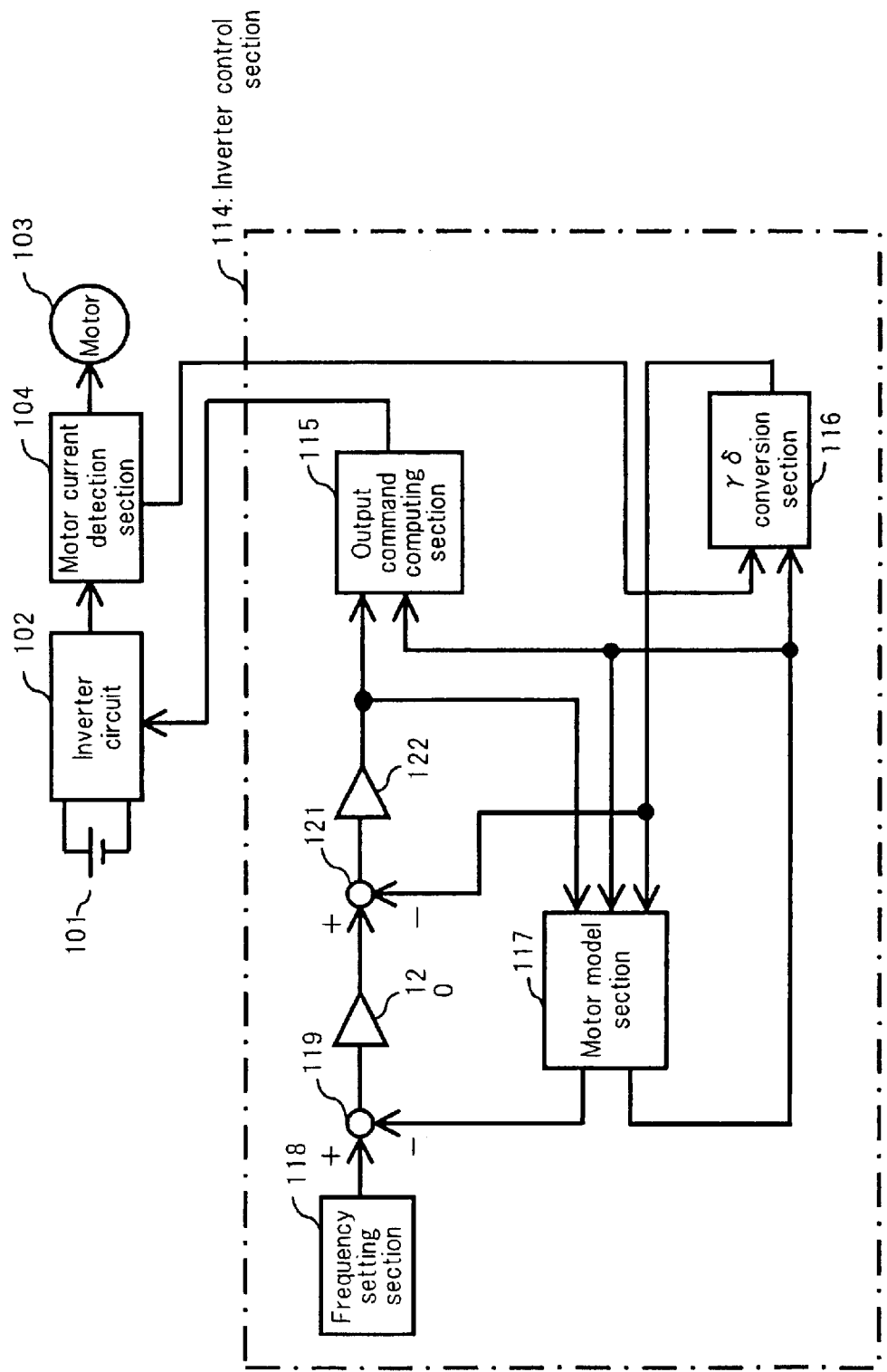
[FIG. 28] (Prior art)

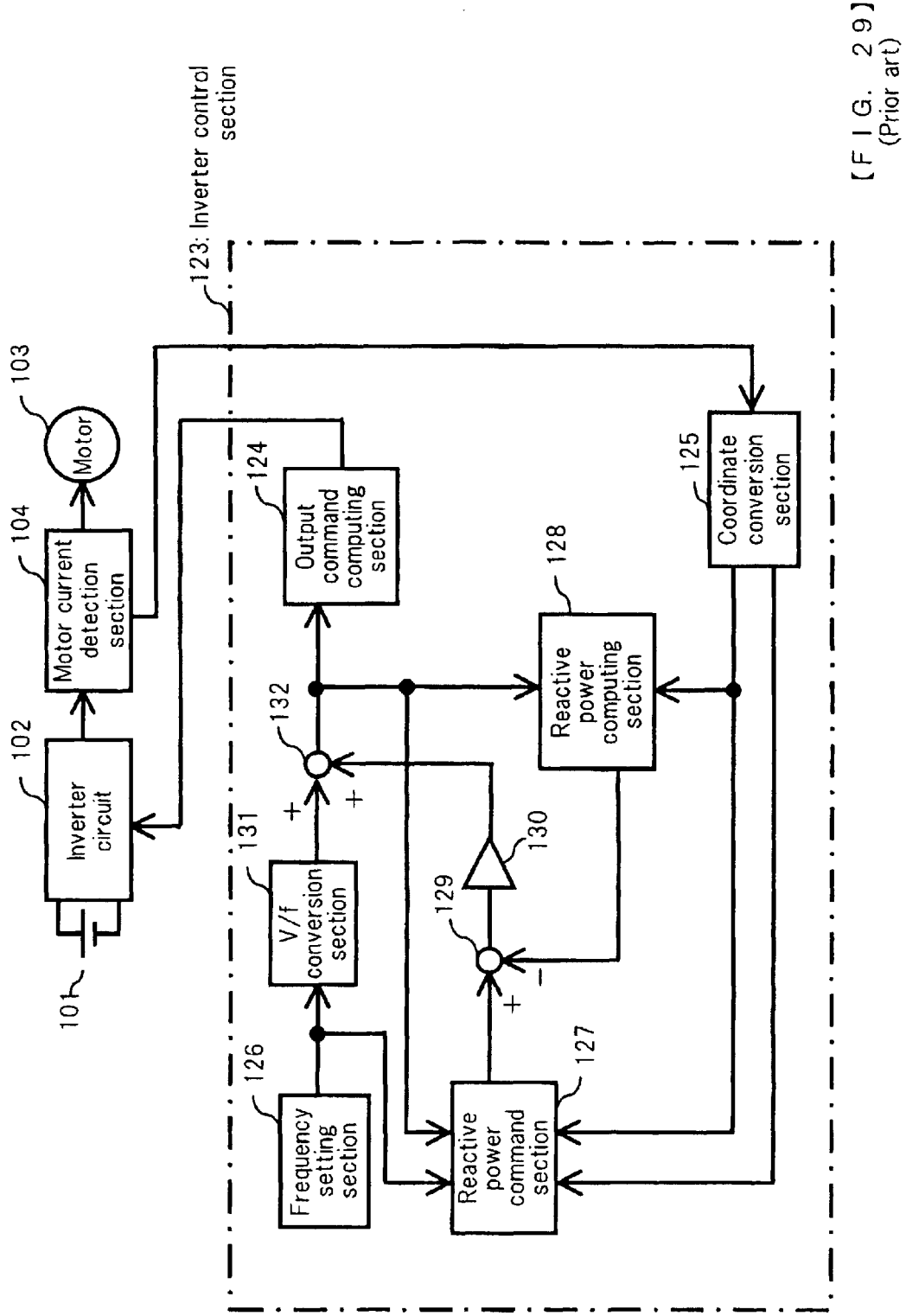
[FIG. 29] (Prior art)

ELECTRIC MOTOR CONTROLLER

BACKGROUND OF THE INVENTION

The present invention relates to an electric motor controller for controlling a synchronous motor without using any position sensors.

A brushless motor is a representative example of a synchronous motor having no position sensor. A method of driving such electric motor is known as a conventional one wherein an induced voltage is detected to detect the position of the rotor of a brushless motor and the brushless motor is driven on the basis of the induced voltage. One of brushless motor driving methods is a rectangular wave driving method wherein a rectangular wave current flows through a brushless motor, and another is a sine wave driving method wherein a sine wave current flows therethrough. In the rectangular wave driving method, the waveform of the current is rectangular. Hence, the rectangular wave driving method is inferior to the sine wave driving method in all of motor vibration and noise. In the sine wave driving method, the zero-cross point of the current of a motor is detected. The applied voltage or command frequency of the motor is feedback-controlled so that the phase difference between the motor current and the applied voltage obtained on the basis of the zero-cross point becomes a desired command value.

The above-mentioned sine wave driving method for an electric motor controller (hereinafter is referred to as motor controller) in accordance with a first prior art will be described below referring to FIG. 26 and FIG. 27. FIG. 26 is a block diagram showing the motor controller in accordance with the first prior art for the sine wave driving method. In FIG. 26, a DC voltage of a DC power source 101 is converted into an AC voltage by an inverter circuit 102 and supplied to a motor 103 via a motor current detection section 104. The current of the motor 3 is detected by the motor current detection section 104 and input to an inverter control section 105. In the inverter control section 105, a frequency set by a frequency setting section 106 is supplied to a wave generation section 107. The wave generation section 107 generates the rotation phase and wave form of a voltage to be applied to the motor 103. The detection output of the motor current detection section 104 is applied to a current zero-cross detection section 108. The current zero-cross detection section 108 detects the zero-cross point of the motor current.

FIG. 27A is a graph showing a rotation phase θ. FIG. 27B is a graph showing the relationship between a motor current Is and an applied voltage Vs in a cycle T which is the inverse of an output frequency fs. As shown in FIG. 27A, the output frequency fs of the frequency setting section 106 is converted into a time T (=1/fs), i.e., a cycle, by the wave generation section 107, thereby generating the rotation phase θ. Furthermore, the wave generation section 107 generates a reference sine wave on the basis of the rotation phase θ. An output command computing section 112 generates the command value of the applied voltage Vs on the basis of the wave of the generated reference sine wave and the amplitude of a voltage computed by an error voltage computing section 111. The command value is applied to the inverter circuit 102. Hence, the motor current Is flows as shown in the waveform graph of FIG. 27B, thereby generating a phase difference ø between the motor current Is and the applied voltage Vs. The motor current Is detected by the motor current detection section 104 is applied to the current zero-cross detection section 108. The current zero-cross detection section 108 detects the phase at the zero-cross point of the motor current Is. The phase at the zero-cross point is applied to a phase difference computing section 109. The phase difference computing section 109 detects the phase difference ø between the applied voltage Vs and the motor current Is. An adder 113 obtains an error between the output of a phase difference command section 110 and the output of the phase difference computing section 109. The error is amplified by an error voltage computing section 111, thereby obtaining the amplitude of the motor applied voltage Vs. The applied voltage Vs, i.e., the output of the output command computing section 112, is subjected to pulse-width modulation (PWM) and applied to switching devices of the inverter circuit 102, thereby driving the inverter circuit 102.

In the above-mentioned first prior art, the zero-cross point of the motor current is detected, and feedback control is carried out so that the phase difference between the motor current Is and the applied voltage Vs becomes a desired command value. The zero-cross point of the motor current Is can be detected once every electrical angle of 180 degrees per phase as shown in FIG. 27B. In the case of three phase currents, the zero-cross point can be detected once every electrical angle of 60 degrees. However, a detection delay owing to sample holding is large in the feedback control wherein the zero-cross point is detected every electrical angle of 60 degrees. This detection delay makes the operation of the motor unstable at a low speed in particular, thereby causing the loss of synchronization, and being apt to produce the problem of stopping the rotation of the motor.

A sine wave driving method in accordance with a second prior art is disclosed in the Transactions of the Institute of Electrical Engineers of Japan, Volume D117, No. 1, 1997 and in Japanese Laid-open Patient Application No. Hei 11-18483. In this driving method, a motor voltage equation represented by the winding resistances of a motor and inductances on d-q axes is prepared in advance. Then, the phase and rotation speed of the motor are estimated from the applied voltage and the actual voltage of the motor, and feedback control is carried out. This second prior art will be described below referring to FIG. 28.

FIG. 28 is a block diagram showing a motor controller in accordance with the second prior art for the sine wave driving method. In FIG. 28, the DC power source 101, the inverter circuit 102, the motor current detection section 104 and the motor 103 are similar to those of the first prior art. The operation of an inverter control section 114 will be described below. The switching devices of the inverter circuit 102 are controlled on the basis of a PWM command value generated by an output command computing section 115, thereby driving the motor 103. The current flowing through the motor 103 at this time is detected by the motor current detection section 104, thereby outputting a detected signal. From the detected signal of the motor current and an estimated phase θ, the motor current is converted on γ-δ coordinate axes by a γδ conversion section 116, thereby outputting currents Iy and Iδ. The coordinate axes are d-q axes estimated on a motor model 117. The motor model 117 solves a motor voltage equation on the basis of the converted current and voltage command values, thereby outputting the estimated values of the phase θ and rotation speed ω. A frequency setting section 118 outputs the rotation frequency command value of the motor. An adder 119 computes the error between the command value of the rotation frequency and the estimated value of the rotation speed ω generated by the motor model 117, and outputs the error to a current command section 120. The current command section 120

PI-controls the error of the adder 119, thereby generating a current command value on the γ-δ axes. An adder 121 computes the error between the current command value from the current command section 120 and the currents Iγ and Iδ from the γδ conversion section 116, and outputs the error to a voltage command section 122. The voltage command section 122 PI-controls the error of the adder 121, thereby generating an applied voltage command value. This applied voltage command value is used for the output command computing section 115 again and three-phase-converted, thereby forming a PWM command value. This PWM command value is used to control the inverter circuit 102 again in the next control cycle.

In the second prior art wherein the d-q axes are estimated by using the motor model, feedback is carried out at every control cycle (for example, at every carrier cycle). Hence, this technology has the advantage that hunting owing to a detection delay hardly occurs. On the other hand, motor parameters, especially inductances, fluctuate significantly owing to the influence of temperature and load. For this reason, if an error occurs between an actual motor parameter and a model used in a controller, the result of the estimation of a phase or a rotation speed becomes different from an actual value. Consequently, the rotation of the motor becomes uncontrollable in the end, thereby resulting in loss of synchronization. Hence, in order to prevent the loss of synchronization, it is necessary to correct the parameter by changing the rotation speed, load or temperature. Furthermore, in order to control motors different in parameters, it is necessary to adjust the parameters. It is thus difficult to readily apply this control to motors different in parameters. Still further, this control requires a large amount of computations since a current minor loop is used. It is thus necessary to use an expensive microcomputer or DSP.

A sine wave driving method in accordance with a third prior art is disclosed in Japanese Laid-open Patient Application No. 2000-262089. In this driving method, reactive power supplied to a motor is detected, and feedback is carried out so that the value of the reactive power becomes a target value. This third prior art will be described below referring to FIG. 29.

FIG. 29 is a block diagram showing a motor controller in accordance with the third prior art for the sine wave driving method. In FIG. 29, the DC power source 101, the inverter circuit 102, the motor current detection section 104 and the motor 103 are similar to those of the first prior art. The operation of an inverter control section 123 will be described below. An output command computing section 124 generates a PWM command signal from a command value of the voltage to be applied to the motor (hereinafter is referred to as "motor applied voltage command value") and feeds the PWM command signal to the inverter circuit 102, thereby controlling the switching devices of the inverter circuit 102 and driving the motor 103. At this time, the motor current detection section 104 detects a current flowing through the motor 103, and outputs a detected signal. A coordinate conversion section 125 decomposes the motor current into an active current and a reactive current on the basis of the detected signal. A frequency setting section 126 outputs the rotation frequency command value of the motor 103. A reactive power command section 127 outputs a reactive power command value from the rotation frequency command value, the motor applied voltage command value, the active current and the reactive current. A reactive power computing section 128 computes a reactive power detected value from the motor applied voltage command value and the reactive current detected value. An adder 129 computes the error between the reactive power command value and the reactive power detected value, and an error voltage computing section 130 generates an applied voltage compensation value on the basis of this error. A V/f conversion section 131 generates a motor reference voltage from the rotation frequency command value. An adder 132 adds the motor reference voltage and the applied voltage compensation value, thereby generating a motor applied voltage command value. The motor applied voltage command value is input to the output command computing section 124 again, thereby generating a PWM command value. This PWM command value is used to control the inverter circuit 102 again at the next control cycle.

In the third prior art wherein feedback control is carried out so that reactive power is commanded so as to become a predetermined value, the feedback control is carried out at every control cycle. Hence, the third prior art has the advantage that hunting owing to a detection delay hardly occurs, just as in the case of the second prior art. Since no current minor loop is used, the third prior art has the advantage that an amount of computations is small, unlike the case of the second prior art. However, since the voltage applied to the motor is almost proportional to the rotation speed of the motor, it is necessary to change the reactive power command value depending on the change in the rotation speed. Still further, since a motor parameter is used for the generation of the command value, correction is necessary depending on the change in the parameter, just as in the case of the second prior art. Hence, the computation of the reactive power command value becomes complicated. After all, the amount of all the computations is large, whereby it is necessary to use an expensive microcomputer or DSP. Just as in the case of the second prior art, in order to control motors different in parameters, it is necessary to adjust the parameters. It is thus difficult to readily apply this control to motors different in parameters. This prior art relates to a controlling wherein the output torque of the motor becomes its maximum value at all times, and in such controlling, the field-weakening control for use in the case of insufficient voltage cannot be carried out. Therefore, there is a problem that the range of the rotation speed is limited.

BRIEF SUMMARY OF THE INVENTION

Object of the present invention is to provide an electric motor controller (hereinafter is referred to as motor controller) capable of stably controlling motor rotation with high efficiency, low noise and low vibration without causing loss of synchronization in a wide operation range.

A motor controller can be made with a small amount of computations, hence with an inexpensive microcomputer.

The controlling of the motor requires no motor parameter and hence readily applicable to motors with different motor parameters.

The motor can easily attain field-weakening control in case of insufficient power source voltage.

The motor controller in accordance with the present invention comprises an inverter circuit having switching devices and diodes for converting a direct current into an alternating current and supplying AC power to a motor, a motor current detection section for detecting a current flowing through the motor and outputting a detected signal, and an inverter control section for controlling the inverter circuit, the inverter control section comprises a setting section for setting a set value. The inverter control section further comprises a detection section, having a reactive current computing section for computing a reactive current by using the detected signal from the motor current detection section, for outputting a detected value on the basis of the output of the reactive current computing section, and a computing section for controlling the inverter circuit on the basis of the output of the setting section and the output of the detection section.

The motor controller in accordance with the present invention detects the instantaneous reactive current of the motor from the motor current, the power factor, the phase difference between the applied voltage and the induced voltage, the phase difference between the rotor shaft and the current or the phase difference between the rotor shaft and the applied voltage. The inverter circuit is controlled so that the detected value becomes equal to a command value, whereby it is possible to drive the motor stably. Inverter control for controlling the inverter circuit forms a feedback loop so as to compensate the voltage value or the phase of the command of the voltage to be applied to the motor. Since the control cycle is sufficiently shorter than the rotation cycle of the motor, unstable operation owing to a sampling and controlling delay does not occur.

According to the present invention, since the cycle of feedback control is short, it is possible to provide a more stable motor controller. In addition, a control loop can be formed without using motor parameters, whereby it is possible to provide a motor controller readily applicable to motors with different motor parameters. According to the invention, the motor parameters can be reduced, whereby it is possible to provide a motor controller that can be adjusted easily for different motors. Motor control is possible without using a minor current loop, whereby it is possible to provide a motor controller requiring a small amount of computations and being capable of comprising an inexpensive microcomputer. Phase compensation and speed compensation can be carried out, whereby it is possible to provide a more stable motor controller. Field-weakening control can be carried out at the time when the voltage of a power source is insufficient, whereby it is possible to provide a motor controller having a wider operation range. Alternating current sensors can be used, whereby it is possible to provide a more inexpensive motor controller

BRIEF DESCRIPTION OF THE SEVERAL VIEWS OF THE DRAWING

FIG. 1 is a block diagram showing a basic configuration of a motor controller in accordance with a first embodiment of the present invention;

FIG. 2 is a block diagram showing an actual example of a motor controller in accordance with the first embodiment of the present invention;

FIG. 3A is a graph showing the vectors of the voltage applied to a motor, a motor current and a phase difference therebetween on d-q axes in accordance with the first to fifth embodiments;

FIG. 3B is a graph showing the vectors of the voltage applied to a motor, a motor current and a phase difference therebetween on a-r axes in accordance with the first to fifth embodiments;

FIG. 5 is a block diagram showing a motor controller in accordance with a third embodiment of the present invention;

FIG. 6 is a block diagram showing a motor controller in accordance with a fourth embodiment of the present invention;

FIG. 7 is a block diagram showing a motor controller in accordance with a fifth embodiment of the present invention;

FIG. 8 is a block diagram showing a motor controller in accordance with a sixth embodiment of the present invention;

FIG. 9 is a block diagram showing a motor controller in accordance with a seventh embodiment of the present invention;

FIG. 10 is a block diagram showing another example of the motor controller in accordance with the seventh embodiment of the present invention;

FIG. 11 is a block diagram showing a motor controller in accordance with an eighth embodiment of the present invention;

FIG. 12 is a block diagram showing another example of the motor controller in accordance with the eighth embodiment of the present invention;

FIG. 13 is a graph showing the vectors of the voltage applied to a motor, a motor current and a phase difference therebetween on d-q coordinate axes in accordance with the eighth embodiment of the present invention;

FIG. 14 is a block diagram showing a motor controller in accordance with a ninth embodiment of the present invention;

FIG. 15A is a graph showing the relationship between the reactive current command value and the efficiency of a motor at a low rotation frequency;

FIG. 15B is a graph showing the relationship between the reactive current command value and the efficiency of the motor at a high rotation frequency;

FIG. 15C is a graph showing the relationship between the phase difference ø command value and the efficiency of the motor at a low rotation frequency;

FIG. 15D is a graph showing the relationship between the phase difference ø command value and the efficiency of the motor at a high rotation frequency;

FIG. 15E is a graph showing the relationship between the rotation frequency and the reactive current command value of the motor during field-weakening control;

FIG. 15F is a graph showing the relationship between the rotation frequency and the phase difference ø command value of the motor during field-weakening control;

FIG. 16 is a block diagram showing a motor controller in accordance with a 10th embodiment of the present invention;

FIG. 17 is a block diagram showing a motor controller in accordance with a 12th embodiment of the present invention;

FIG. 18A is a graph showing the rotation frequency target value, applied voltage command value and reactive current command value of a motor changing with time during acceleration in field-weakening control in accordance with the 12th embodiment of the present invention;

FIG. 18B is a graph showing the rotation frequency target value, applied voltage command value and reactive current command value of a motor changing with time during deceleration in field-weakening control in accordance with the 12th embodiment of the present invention;

FIG. 19 is a block diagram showing a motor controller in accordance with a 13th embodiment of the present invention;

FIG. 20 is a block diagram showing a motor controller in accordance with a 14th embodiment of the present invention;

FIG. 21 is a block diagram showing a motor controller in accordance with a 17th embodiment of the present invention;

FIG. 22 is a block diagram showing a current detection section in accordance with an 18th embodiment of the present invention;

FIG. 23 is a block diagram showing a motor controller in accordance with a 19th embodiment of the present invention;

FIG. 24 is a graph showing the characteristics of an alternating current sensor;

FIG. 25 is a graph showing the vectors of motor currents in accordance with the 19th embodiment of the present invention;

FIG. 26 is a block diagram showing a motor controller in accordance with the first prior art;

FIG. 27A is a graph showing the relationship between the cycle T and rotation phase θ depending on the set frequency of the wave generation section of the motor controller in accordance with the first prior art shown in FIG. 26;

FIG. 27B is a graph showing the relationship among the cycle T, motor current Is and motor voltage Vs of the motor controller in accordance with the first prior art shown in FIG. 26, FIG. 28 is a block diagram showing a motor controller in accordance with the second prior art; and FIG. 29 is a block diagram showing a motor controller in accordance with the third prior art.

DETAILED DESCRIPTION OF THE INVENTION

Figure 4:
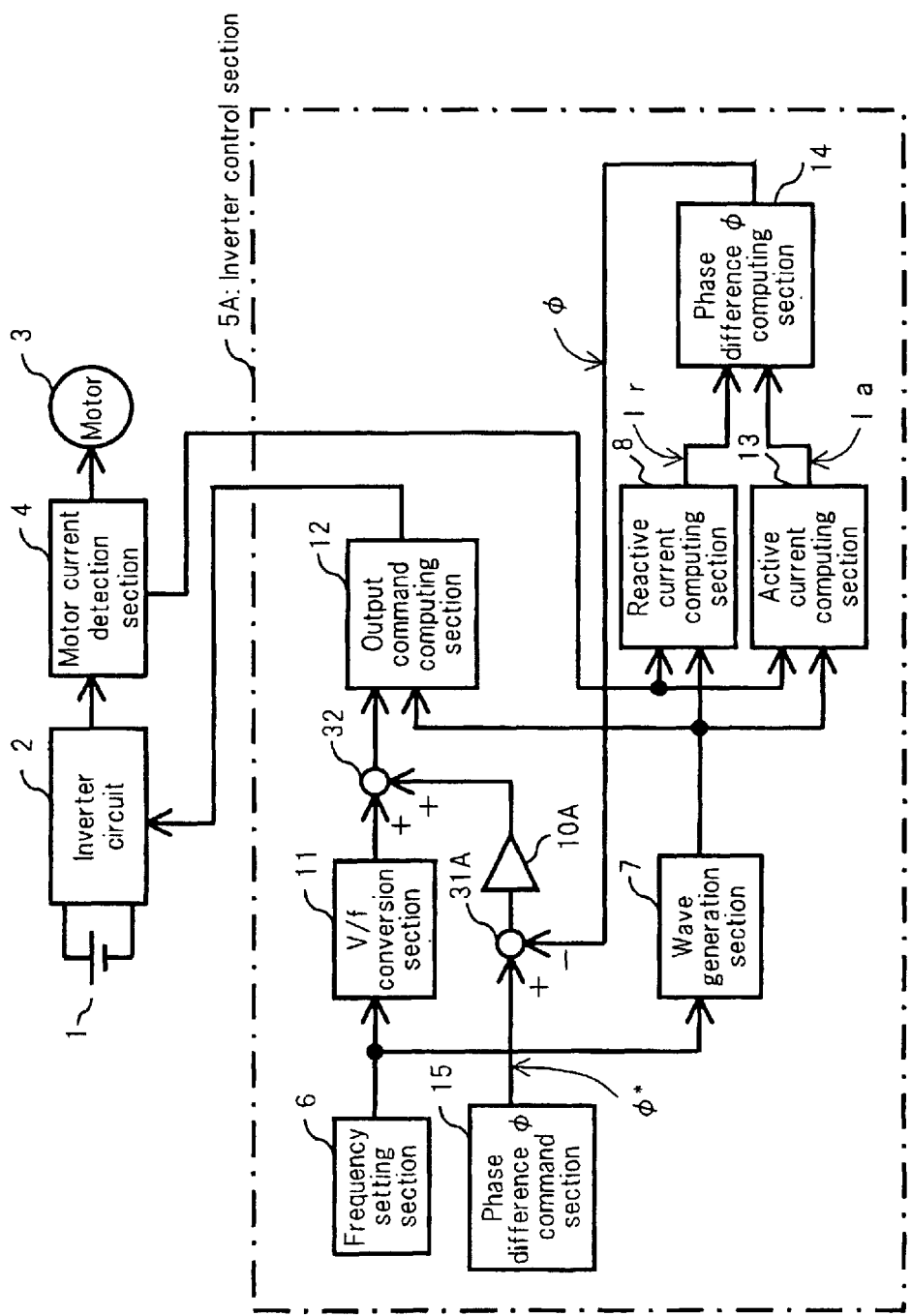
FIG. 4 is a block diagram showing a motor controller in accordance with a second embodiment of the present invention.

Motor controllers in accordance with preferred embodiments of the present invention will be described below referring to FIG. 1 to FIG. 25.

First Embodiment

FIG. 1 is a block diagram showing a basic configuration of a motor controller in accordance with a first embodiment of the present invention. Referring to FIG. 1, the direct current of a DC power source 1 is applied to an inverter circuit 2 and converted into an alternating current. The alternating current is supplied to a motor 3 via a motor current detection section 4. The motor 3 is a synchronous brushless motor, for example, and not provided with position sensors for detecting the position of its rotor. The output of the motor current detection section 4 is input to a detection section 57 having a reactive current computing section 54. The detection section 57 is included in an inverter control section 55. The detection section 57 computes a reactive current and outputs a detected value on the basis of the value of the reactive current to a computing section 58. Various set values to control the inverter circuit 2 are set in a setting section 56, and these will be detailed later. The set value is a target value of the detected value output from the detection section 57. The set value may be a constant value or a value changing depending on the rotation frequency or load torque of the motor 3. The set value and the detected value are input to the computing section 58. The computing section 58 performs a predetermined computation and output a command value for driving the inverter circuit 2 so that the detected value becomes equal to the set value. By repeating the above-mentioned series of operations at a predetermined control cycle, the detected value is controlled so as to be made equal to the set value. The motor 3 can thus be driven in a predetermined state.

FIG. 2 is a block diagram showing a preferred actual example of a motor controller in accordance with this embodiment. In this example, it is assumed that the detected value and the set value are reactive currents. In an inverter control section 5, the frequency of an input signal for controlling the inverter circuit 2 is set in a frequency setting section 6. The input signal having the preset frequency is applied to a wave generation section 7 and a V/f conversion section 11. The wave generation section 7 generates a rotation phase signal from the applied input signal, and applies the rotation phase signal to an reactive current computing section 8 and an output command computing section 12. The reactive current computing section 8 obtains a reactive current from the detection output of the motor current detection section 4 and the output of the wave generation section 7, and applies the reactive current to one input terminal of an adder 31. A reactive current command value output from an reactive current command section 9 is applied to the other input terminal of the adder 31. The addition output of the adder 31 is applied to an error voltage computing section 10, and an error voltage is obtained. The output of the error voltage computing section 10 is added to the output of the V/f conversion section 11 at an adder 32. The result of the addition is input to the output command computing section 12. The output of the output command computing section 12 is applied to the inverter circuit 2, thereby driving the inverter circuit 2. The detection section 57 in FIG. 1 corresponds to the reactive current computing section 8, and the setting section 56 in FIG. 1 corresponds to the reactive current command section 9 in FIG. 2. The computing section 58 in FIG. 1 corresponds to the other sections in FIG. 2.

The operation of the inverter control section 5 will be described below. It is assumed that voltages to be applied to the three-phase windings (not shown) of the motor 3 are Vu, Vv and Vw. The output command computing section 12 performs a computation represented by Equation (1) by using a rotation phase signal θ from the wave generation section 7 and a command value Va of the voltage to be applied to a motor (hereinafter is referred to as motor applied voltage command value Va) from the adder 32.

$$\left. \begin{array}{l} Vu = \sqrt{\dfrac{2}{3}} \times Va \times \sin\theta \\[6pt] Vv = \sqrt{\dfrac{2}{3}} \times Va \times \sin\!\left(\theta - \dfrac{2}{3}\pi\right) \\[6pt] Vw = \sqrt{\dfrac{2}{3}} \times Va \times \sin\!\left(\theta - \dfrac{4}{3}\pi\right) \end{array} \right\} \quad (1)$$

The output command computing section 12 outputs a signal for PWM-driving the switching devices 41 to 46 (FIG. 22) of the inverter circuit 2 so that a voltage obtained as the result of the computation is applied to the motor 3. The motor current detection section 4 detects currents at least two phases of the three phases of the motor 3, and inputs the detected signals to the reactive current computing section 8. It is assumed that the detected signals output when the motor current detection section 4 detects the currents of the U, V and W phases are Iu, Iv and Iw. The reactive current computing section 8 performs a computation represented by Equation (2), thereby obtaining a reactive current detected value Ir.

$$Ir = \sqrt{\frac{2}{3}} \times \left\{ Iu \times \cos\theta + Iv \times \cos\left(\theta - \frac{2}{3}\pi\right) + Iw \times \cos\left(\theta - \frac{4}{3}\pi\right) \right\} \quad (2)$$

Because of the relationship of Iu+Iv+Iw=0, when the motor current detection section 4 detects the currents of at least two phases, the reactive current computing section 8 can perform the computation represented by Equation (2).

FIG. 3A is a vector graph showing the relationship among the applied voltage command value Va, the induced voltage Vo of the motor and a motor current Is flowing through the motor 3 on d-q axes. A voltage generated by magnets disposed in the rotor of the motor 3 is on the q axis. The induced voltage Vo including a reluctance component is generated between the rotor and stator of the motor 3. The vector difference between the motor applied Voltage command value Va and the induced voltage Vo is obtained by multiplying the winding resistance R of the motor with the motor current Is. The reactive current detected value Ir obtained by the computation represented by Equation (2) is a component of the motor current Is in a direction perpendicular to the direction of the applied voltage command value Va. When the reactive current detected value Ir is shown on a-r axes, that is, when the motor current Is is decomposed along the a axis in a direction parallel to the applied voltage command value Va and along the r axis in a direction perpendicular to the a axis as shown in FIG. 3B, the reactive current detected value Ir is a component in the direction of the r axis. Hence, the reactive current detected value Ir can also be represented by Equation (3).

$$Ir = Is \times \sin\phi \quad (3)$$

wherein ø is the phase difference between the applied voltage command value Va and the motor current Is and represents a power factor.

In FIG. 2, the reactive current command section 9 outputs a reactive current command value Ir*. The adder 31 adds the reactive current command value Ir* to the reactive current detected value Ir, and outputs the result of the addition as an error. The error voltage computing section 10 computes a voltage compensation value on the basis of this error so that the reactive current detected value Ir is close to the reactive current command value Ir*, and outputs the voltage compensation value. Computation methods for conventional control, such as proportional (P) control, proportional and integral (PI) control, and proportional, integral and differential (PID) control, can be used to compute the voltage compensation value. At this time, each control gain may be a fixed value or may be changed depending on the rotation frequency or load of the motor. The computation methods for the error voltage computing section 10 are ordinary methods. The operation of the error voltage computing section 10 of the present invention is not limited to these methods. The reactive current command value Ir* may be changed depending on the rotation frequency or load of the motor.

The frequency setting section 6 outputs a rotation frequency command value representing the rotation frequency of the motor 3. On the basis of this rotation frequency command value, the V/f conversion section 11 outputs a basic voltage command value to be applied to the motor 3. In the case when the motor 3 is a brushless motor, its applied voltage is proportional to its rotation speed. Hence, the voltage command value is generally obtained by multiplying the rotation frequency command value by a constant value. An acceleration torque is required at the start of operation of the motor. Hence, another method of generating the voltage command value may be used. For example, a slightly larger voltage command value may be output. The method of generating the voltage command value described in this embodiment is an ordinary method. The operation of the V/f conversion section of the present invention is not limited to this method of generating the voltage command value.

The adder 32 adds the voltage command value output from the V/f conversion section 11 to the voltage compensation value output from the error voltage computing section 10, and generates the motor applied Voltage command value Va for the next control cycle. By repeating the above-mentioned series of operations at each control cycle, the excessive or insufficient amount of the voltage to be applied to the motor 3 is compensated for in the end. This control cycle is the same as a carrier cycle of which the switching devices of the inverter circuit 2 repeat ON/OFF operations. An ordinary carrier cycle is about several tens of $\mu$ seconds to several hundreds of $\mu$ seconds. In other words, the carrier frequency corresponding thereto is about several kHz to several tens of kHz. On the other hand, the rotation frequency of a motor differs depending on usage. When a motor is used for a compressor in an air conditioner or a refrigerator or used for a fan or a pump, its rotation frequency is up to several hundreds of Hz. This value is far smaller than the carrier frequency. In the first prior art, motor control can be carried out at a frequency only about several times as high as the rotation frequency of the motor, thereby occasionally resulting in delayed control and detection, and causing unstable motor rotation. In this embodiment, however, motor control can be carried out at a carrier frequency far higher than the rotation frequency of the motor, that is, at a far shorter cycle. Hence, control and detection are not delayed, and motor rotation is made stable.

In addition, the reactive current is detected by using Equation (1) to Equation (3), whereby motor parameters are not required. In this respect, this embodiment differs from the second and third prior arts. The motor controller in accordance with the present invention is also applicable to motors with different motor parameters, such as inductance values and winding resistance values, without requiring parameter adjustments. Furthermore, only a small amount of computations is required, whereby it is possible to attain a motor controller comprising an inexpensive microcomputer.

Second Embodiment

FIG. 4 is a block diagram showing a motor controller in accordance with a second embodiment of the present invention. In FIG. 4, an inverter control section 5A is obtained by adding an active current computing section 13 and a phase difference ø computing section 14 to the inverter control section 5 in the first embodiment shown in FIG. 2, and by replacing the reactive current command section 9 of the inverter control section 5 with a phase difference ø computing section 15. In the other configurations, the motor controller in the second embodiment is the same as that in the first embodiment. The phase difference ø is the phase difference between the applied voltage command value Va and the motor current Is. The active current computing section 13 obtains an active current Ia from the computation of Equation (4).

$$Ia = \sqrt{\frac{2}{3}} \times \left\{ Iu \times \sin\theta + Iv \times \sin\left(\theta - \frac{2}{3}\pi\right) + Iw \times \sin\left(\theta - \frac{4}{3}\pi\right) \right\} \quad (4)$$

The active current Ia obtained from the computation of Equation (4) is a component of the motor current Is in a direction in parallel with the direction of the applied voltage command value Va in the vector graph shown in FIG. 3B. In other words, when the motor current Is is decomposed along the "a" axis in a direction parallel to the applied voltage command value Va and along the "r" axis in a direction perpendicular to the "a" axis as shown in FIG. 3B, the active current Ia is a component in the direction of the "a" axis. Hence, the active current detected value Ia can also be represented by Equation (5).

$$Ia = Is \times \cos\phi \quad (5)$$

Equation (6) can be derived from Equation (3) and Equation (5).

$$\phi = \text{Tan}^{-1}\left(\frac{Ir}{Ia}\right) \quad (6)$$

The phase difference ø computing section 14 obtains the phase difference ø from Equation (6).

The phase difference ø command section 15 outputs a command value ø* of a phase difference ø (hereinafter is referred to as phase difference ø command value ø*). An adder 31A adds the phase difference ø command value ø* to a detected value ø of the phase difference ø (hereinafter is referred to as phase difference ø detected value), and outputs the result of the addition as an error. An error voltage computing section 10A computes a voltage compensation value on the basis of this error so that the phase difference ø detected value is close to the phase difference ø command value ø*. The subsequent operations of the inverter control section 5A are similar to those of the inverter control section 5 in the first embodiment shown in FIG. 2.

Since the phase difference ø represented by an angle is a power factor angle, the power factor of the motor, that is, the distribution ratio of active power and reactive power can be set directly by controlling the phase difference ø. It is thus easy to set the driving state of the motor.

FIG. 15A is a graph showing the result of an experiment and representing the relationship between the reactive current command value Ir* and the efficiency of the motor in the case when the rotation frequency of the motor is a low constant value and when a load is used as a parameter. FIG. 15C is a graph showing the result of an experiment and representing the relationship between the phase difference ø command value ø* and the efficiency of the motor. It is understood from FIG. 15A that the reactive current command value Ir* wherein the maximum efficiency of the motor is obtained must be changed depending on the load. Hence, in order to drive the motor so that the maximum efficiency of the motor is obtained regardless of the change of the load, the reactive current command value must be changed depending on the load. On the other hand, it is understood from FIG. 15C that the phase difference ø command value ø* wherein the maximum efficiency of the motor is obtained remains unchanged regardless of the change of the load and may have a constant value. As a result, when the motor is desired to be driven so that the maximum efficiency of the motor is obtained at all times, the reactive current command value Ir* must be changed depending on the load. However, the phase difference ø command value ø* should only be set at a constant value regardless of the load. Hence, in feedback control, it is possible to obtain an effect of making the setting by using the phase difference ø command value ø* simpler than the setting by using the reactive current command value Ir*.

In addition, the phase difference ø is detected by using Equation (1) to Equation (6), whereby motor parameters are not required. In this respect, this embodiment differs from the second and third prior arts. The motor controller in accordance with the present invention is applicable to motors with different motor parameters, such as inductance values and winding resistance values, without requiring parameter adjustments. Furthermore, only a small amount of computations is required, whereby it is possible to attain a motor controller comprising an inexpensive microcomputer.

Third Embodiment

FIG. 5 is a block diagram showing a motor controller in accordance with a third embodiment of the present invention. In FIG. 5, an inverter control section 5B is obtained by replacing the phase difference ø computing section 14 of the inverter control section 5A in the second embodiment shown in FIG. 4 with a phase difference α computing section 16 and by replacing the phase difference ø command section 15 of the inverter control section 5A with a phase difference α command section 17. The phase difference α computing section 16 computes a phase difference α from the output of the reactive current computing section 8, the output of the active current computing section 13 and a motor applied voltage command value, i.e., the output of the adder 32, by Equation (7).

$$\alpha = \text{Tan}^{-1}\left(\frac{R \times Ir}{Va - R \times Ia}\right) \quad (7)$$

"R" in Equation (7) represents the resistance of a winding of one phase of the motor 3. The phase difference α indicated by an angle is the phase difference between the applied voltage command value Va and the induced voltage Vo as shown in FIG. 3A.

The phase difference α command section 17 outputs a command value α* of the phase difference α (hereinafter is referred to as phase difference α command value α*). An adder 31B adds the phase difference α command value α* to a detected value α of phase difference α (hereinafter is referred to as phase difference α detected value), and outputs the result of the addition as an error. An error voltage computing section 10B computes a voltage compensation value on the basis of this error so that the phase difference α detected value is close to the phase difference α command value α*. The other configurations and operations of the inverter control section 5B are similar to those of the inverter control section 5A in the second embodiment.

In feedback control, the phase difference α has an effect similar to that of the phase difference ø shown in FIG. 15C. Hence, when the motor is desired to be driven so that the maximum motor efficiency is obtained at all times, the phase difference α command value α* may be set to a constant value. Furthermore, since the rotation frequency of the motor is not stable when the motor is started, an induced voltage ω·ψ (FIG. 3A) generated by the magnets of the rotor changes significantly. Hence, the induced voltage Vo changes greatly in its magnitude and direction, and the motor current Is also changes greatly. As a result, when the motor is started, the phase difference ø between the applied voltage command value Va and the motor current Is fluctuate greatly. The phase difference ø detected value has various values, thereby making control difficult. On the other hand, since the fluctuation amount of the phase difference α is small, the detected value of the phase difference a does not have various values at the start operation of the motor and thereafter. As a result, by using the phase difference α, stable feedback control can be carried out, whereby it is possible to obtain an effect of making motor control easy at the start operation of the motor and thereafter.

Only the winding resistance R of the motor is necessary for the detection of the phase difference α. It is not necessary to use an inductance value that changes significantly depending on a load. Hence, correction depending on a load is not necessary, whereby it is possible to attain an inexpensive motor controller. Furthermore, only a small amount of computations is required, whereby it is possible to attain a motor controller comprising an inexpensive microcomputer.

Fourth Embodiment

FIG. 6 is a block diagram showing a motor controller in accordance with a fourth embodiment of the present invention. In FIG. 6, an inverter control section 5C is obtained by replacing the phase difference α computing section 16 of the inverter control section 5B in the third embodiment shown in FIG. 5 with a phase difference β computing section 18 and by replacing the phase difference α command section 17 of the inverter control section 5B with a phase difference β command section 19. The phase difference β computing section 18 computes a phase difference β from the output of the reactive current computing section 8, the output of the active current computing section 13, the output of the adder 32 and the output of the frequency setting section 6 by Equation (8).

$$\beta = \text{Tan}^{-1}\left(\frac{Va \times Ir - \omega \times Lq \times Is^2}{Va \times Ia - R \times Is^2}\right) \quad (8)$$

The phase difference β represented by an angle is the phase difference between the q axis serving as the rotor shaft and the motor current Is as shown in FIG. 3A.

Another preferable example of this embodiment will be described below. Reactive power Pr is given by Equation (9).

$$Pr = \{-\psi \times Id - (Lq-Ld) \times Id^2 + Lq \times Is^2\} \times \omega \quad (9)$$

wherein ψ represents a magnetic flux, Ld and Lq represent the d-axis component and the q-axis component of an inductance, respectively. Id and Iq represent the d-axis component and the q-axis component of the motor current Is, respectively. When Equation (9) is solved with respect to Id, Equation (10) is obtained.

$$Id = [-\psi + \sqrt{\psi^2 + 304(Lq-Ld) \times (Pr/\omega - Lq \times Is^2)}]/(2 \times (Lq-Ld)) \quad (10)$$

On the other hand, the reactive power Pr can also be represented by Equation (11).

$$Pr = Va \times Is \sin \phi = Va \times Ir \quad (11)$$

Furthermore, the relationship between the d-axis component of the motor current Is and the motor current Is is represented by Equation (12).

$$Id = Is \times \sin \beta \quad (12)$$

Hence, by solving Equations (9) to (12) with respect to β, Equation (13) is obtained.

$$\beta = \text{Sin}^{-1}\left(\frac{-\psi + \sqrt{\psi^2 + 4 \times (Lq-Ld) \times (Va \times Ir/\omega - Lq \times Is^2)}}{2 \times (Lq-Ld) \times \sqrt{Ia^2 + Ir^2}}\right) \quad (13)$$

Where, the magnetic flux ψ, d-axis component Ld and q-axis component Lq are motor parameters which are known in advance. Therefore, the phase difference β can be obtained by computation, when the applied voltage command value Va, the rotation frequency ω of the motor, the active current Ia and the reactive current Ir can be detected.

The phase difference β command section 19 outputs a command value β* of the phase difference β (hereinafter is referred to as phase difference β command value β*). An adder 31C adds the phase difference β command value β* to a detected value β of the phase difference β (hereinafter is referred to as phase difference β detected value) output from the phase difference β computing section 18, and outputs the result of the addition as an error. An error voltage computing section 10C computes a voltage compensation value on the basis of this error so that the phase difference β detected value is close to the phase difference β command value β*. The other configurations and operations of the inverter control section 5C are similar to those of the inverter control section 5B in accordance with the third embodiment.

The phase difference β has a physical meaning in motor control which difference β is the phase difference between the rotor reference axis "q" and the motor current Is for directly controlling torque. Hence, the phase difference β can be set easily. For example, in the case when the motor has a non-salient pole structure just as in the case of the 15th Embodiment described later, the motor can be driven so as to deliver high torque at all times by controlling the motor current Is so that the phase difference β is zero. Furthermore, as described in the explanations of the 16th embodiment, in the case of a motor having a salient pole structure, the motor can be driven so as to deliver high torque at all times by carrying out control. So that the phase difference β keeps a relationship represented by a function determined by the current and rotation speed thereof. Hence, when it is desired to drive the motor at high torque, the phase difference β should be detected, and control should be carried out on the basis of the phase difference β as described above. It is thus possible to easily attain high torque driving.

When Equation (8) is used to detect the phase difference β, the q-axis component of the inductance and the winding resistance are necessary, but the d-axis component of the inductance is not necessary. It is thus possible to attain a motor controller having a small amount of parameter correction items depending on the load and rotation speed.

Fifth Embodiment

FIG. 7 is a block diagram showing a motor controller in accordance with a fifth embodiment of the present invention. In FIG. 7, an inverter control section 5D is obtained by replacing the phase difference β computing section 18 of the inverter control section 5C in the fourth embodiment shown in FIG. 6 with a phase difference δ computing section 20 and by replacing the phase difference β command section 19 of the inverter control section 5C with a phase difference δ command section 21. The phase difference δ computing section 20 computes a phase difference δ from the output of the reactive current computing section 8, the output of the active current computing section 13, the output of the adder 32 and the output of the frequency setting section 6 on the basis of Equations (6), (8) and (14).

$$\delta = \beta - \varphi \tag{14}$$

As shown in FIG. 3A, the phase difference δ is the angle between the "q" axis serving as the rotor shaft and the motor applied voltage command value vector Va, and is referred to as a load angle.

The phase difference δ command section 21 outputs a command value δ* of the phase difference δ (hereinafter is referred to as phase difference δ command value δ*). An adder 31D adds the phase difference δ command value δ* to a detected value δ of the phase difference δ (hereinafter is referred to as phase difference δ detected value), and outputs the result of the addition as an error. An error voltage computing section 10D computes a voltage compensation value on the basis of this error so that the phase difference δ detected value is close to the phase difference δ command value δ*. The other configurations and operations of the inverter control section 5D are similar to those of the inverter control section 5C in the fourth embodiment.

The phase difference δ is referred to as a load angle. The larger the load, the larger the phase difference δ. The load angle has a physical meaning in which the load angle is a theoretical angle indicating the limit of the loss of synchronization of the motor. Hence, it is possible to know whether the motor driving state is near the limit of the loss of synchronization or not, by detecting the load angle. Since the phase difference δ can be detected in this embodiment, it is possible to know whether the motor is driven near the limit of the loss of synchronization or not. Therefore, a countermeasure can be taken so as not to cause the loss of synchronization, whereby it is possible to attain a more stable motor controller.

When Equation (8) is used to detect the phase difference δ, the q-axis component of the inductance and the winding resistance are necessary, but the d-axis component of the inductance is not necessary. It is thus possible to attain a motor controller having a small amount of parameter correction items depending on the load and rotation speed.

Sixth Embodiment

FIG. 8 is a block diagram showing a motor controller in accordance with a sixth embodiment of the present invention. In FIG. 8, an inverter control section 5E is obtained by adding a phase compensation section 22 and an adder 33 to the inverter control section 5 in the first embodiment shown in FIG. 2, and by replacing the adder 31 of the inverter control section 5 with an adder 31E.

The adder 31E adds the reactive current command value to the reactive current detected value, and applies the result of the addition as an error to the error voltage computing section 10 and the phase compensation section 22. The phase compensation section 22 outputs a phase compensation value for compensating for the rotation phase signal θ so that the error between the reactive current command value and the reactive current detected value becomes small, and outputs the phase compensation value to the adder 33. The adder 33 adds the phase compensation value to the rotation phase signal output from the wave generation section 7, thereby generating a new rotation phase signal. The rotation phase signal is applied to the output command computing section 12 and the reactive current computing section 8. Proportional control, proportional and integral control or proportional, integral and differential control is generally used for the processing in the phase compensation section 22. However, the present invention is not limited to the use of these methods for the processing in the phase compensation section 22. Furthermore, the control gain of the phase compensation section 22 may be changed depending on the driving state of the motor.

By providing the phase compensation section 22 and the adder 33, phase compensation can be attained even when a phase deviation due to a sudden change in load occurs in the motor. Hence, it is possible to attain more stable motor driving.

In this embodiment having the configuration shown in FIG. 8, the error between the reactive current command value and the reactive current detected value is used for phase compensation. However, a similar effect can also be obtained when phase compensation is carried out by using one of the error of the phase difference ø, the error of the phase difference β and the error of the phase difference δ and by appropriately setting the control gain depending on the corresponding error.

Seventh Embodiment

FIG. 9 is a block diagram showing a motor controller in accordance with a seventh embodiment of the present invention. In FIG. 9, an inverter control section 5F is obtained by adding a fluctuation amount computing section 23 to the inverter control section 5 in the first embodiment shown in FIG. 2.

After receiving the result of the computation of the reactive current from the reactive current computing section 8, the fluctuation amount computing section 23 computes the difference between the result of the computation of the reactive current in the control of the last time and the result of the computation of the reactive current in the control of this time in the control which is repeated at a constant cycle. From this difference, the estimated fluctuation amount of the rotation frequency of the motor 3 is obtained. It is preferable that the fluctuation amount of the rotation frequency should be zero inherently. Hence, the estimated fluctuation amount is inverted and amplified, thereby determining the output of the fluctuation amount computing section 23. An adder 32A adds the output of the fluctuation amount computing section 23, the output of the error voltage computing section 10 and the output of the V/f conversion section 11, and outputs the motor applied Voltage command value Va. In this embodiment, the fluctuation amount of the rotation frequency can be fed back to the applied voltage command value. Hence, it is possible to attain a more stable motor controller, even when the rotation frequency fluctuates.

FIG. 10 is a block diagram showing another example of the motor controller in accordance with the seventh embodiment. An inverter control section 5G is obtained by replacing the fluctuation amount computing section 23 of the inverter control section 5F shown in FIG. 9 with a fluctuation amount computing section 23A, by replacing the adder 32A of the inverter control section 5F with the adder 32 and by adding an adder 34.

After receiving the result of the computation of the reactive current from the reactive current computing section 8, the fluctuation amount computing section 23A computes the difference between the result of the computation of the reactive current in the control of the last time and the result of the computation of the reactive current in the control of this time. From this difference, the fluctuation amount computing section 23A obtains the estimated fluctuation amount of the rotation frequency of the motor 3. This estimated fluctuation amount is then inverted, amplified and output to the adder 34. The adder 34 adds the output of the frequency setting section 6 to the output of the fluctuation amount computing section 23A, and outputs the result of the addition to the wave generation section 7. In this example of the embodiment, the fluctuation amount of the rotation frequency is fed back to the rotation frequency command value of the frequency setting section 6. Hence, it is possible to attain a more stable motor controller, even when the rotation frequency of the motor 3 fluctuates.

In the seventh embodiment, the fluctuation amount is obtained from the output of the reactive current computing section 8, whereby the estimated value of the fluctuation amount is obtained. However, it may be possible to carry out feedback control by using one of the outputs of the phase difference ø computing section, the phase difference α computing section, the phase difference β computing section and the phase difference δ computing section in the second to fifth embodiments and by appropriately setting the fluctuation amount depending on the corresponding output.

Eighth Embodiment

FIG. 11 is a block diagram showing a motor controller in accordance with an eighth embodiment of the present invention. In FIG. 11, an inverter control section 5H is obtained by adding the active current computing section 13, a current compensation section 24 and an adder 35 to the inverter control section 5 in the first embodiment shown in FIG. 2.

The current compensation section 24 computes the motor current Is from the outputs of the reactive current computing section 8 and the active current computing section 13 in accordance with Equation (15). The average value of the motor current Is is computed, and the error between the instantaneous value and the average value of the motor current Is is amplified and output as a rotation phase fluctuation amount.

$$Is=\sqrt{Ia^2+Ir^2} \quad (15)$$

The adder 35 adds the output of the wave generation section 7 and the output of the current compensation section 24, thereby generating a new rotation phase command value θ. This value is applied to the output command computing section 12, the reactive current computing section 8 and the active current computing section 13.

In an ordinary motor driving state, the active current Ia is larger than the reactive current Ir, and the reactive current Ir has a value almost close to zero. Hence, the active current Ia may be used as an approximate value of the motor current Is, and the voltage compensation value may be determined on the basis of the error between the instantaneous value and the average value of the active current Ia.

FIG. 12 is a block diagram showing another preferable example of the motor controller in accordance with this embodiment. An inverter control section 5I is obtained by replacing the current compensation section 24 of the inverter control section 5H shown in FIG. 11 with a current compensation section 24A, by replacing the adder 32 of the inverter control section 5H with an adder 32A and by eliminating the adder 35 of the inverter control section 5H.

The current compensation section 24A computes the motor current Is from the outputs of the reactive current computing section 8 and the active current computing section 13 in accordance with Equation (15). Furthermore, the average value of the motor current Is is computed, and the error between the instantaneous value and the average value of the motor current Is is amplified and the error is output as a voltage compensation amount. The adder 32A adds the output of the V/f conversion section 11, the output of the error voltage computing section 10 and the output of the current compensation section 24A, thereby generating a new applied Voltage command value Va.

In an ordinary motor driving state, the active current Ia is larger than the reactive current Ir, and the reactive current Ir is close to zero. Hence, the active current Ia may be used as a value approximate to the motor current Is. Furthermore, the voltage compensation amount may be determined on the basis of the error between the instantaneous value and the average value of the active current Ia.

Hunting is liable to occur owing to the fluctuation in the rotation frequency of the motor depending on the driving conditions of the motor and a system including the load of the motor. When hunting occurs, the motor current Is fluctuates at a frequency lower than the rotation frequency because of the inertia of the rotor and the load. FIG. 13 shows voltage vectors on the d-q axes at the time when this kind of phenomenon occurs. As shown in FIG. 13, the d-q axes change to the d'-q' axes, and the rotation frequency fluctuates. Hence, the phase difference δ between the applied voltage command value Va and the q axis fluctuates at a frequency lower than the rotation frequency. It is assumed that an induced voltage on the q axis is Vo and that a motor current flowing at this time is Is. Furthermore, it is also assumed that an induced voltage on the q' axis is Vo' and that a motor current flowing at this time is Is'. Since the induced voltage Vo' is smaller than the induced voltage Vo at this time, the motor current Is' becomes larger than the motor current Is. The difference in magnitude between the motor current Is and the motor current Is' relates to the phase difference δ between the applied voltage Va and the q axis. In this embodiment, the error between the instantaneous value and the average value of the motor current Is is fed back to the rotation phase command θ as a rotation phase fluctuation amount. Consequently, the fluctuation in the phase difference δ can be made smaller, whereby it is possible to obtain more stable motor control. In addition, in this embodiment, the error between the instantaneous value and the average value of the motor current Is may be fed back to the motor applied voltage command value Va as a voltage compensation amount. Hence, the fluctuation in the phase difference δ can be made smaller, and it is possible to obtain a more stable motor controlling.

As a control method for converting the error of the motor current Is into the rotation phase fluctuation amount or the voltage compensation amount in this embodiment, proportional control (P control), proportional and integral control (PI control), proportional, integral and differential control (PID control), etc. are used generally. However, the control method of the present invention is not limited to these methods. The control gain in the control may be changed depending on the driving states of the motor, such as the load, rotation frequency of the motor. Furthermore, when the error between the average value and the instantaneous value is smaller than a predetermined value, the error is assumed to be a detection error, and the output may be assumed to be zero.

This embodiment is based on the first embodiment wherein the reactive current is detected and controlled. However, the configuration of this embodiment can be combined with the motor controller described in the explanations of the second to fifth embodiments.

Ninth Embodiment

FIG. 14 is a block diagram showing a motor controller in accordance with a ninth embodiment of the present invention. In FIG. 14, an inverter control section 5J is obtained by adding the active current computing section 13, the phase difference ø computing section 14, the phase difference ø command section 15, the adder 31A, the error voltage computing section 10A and a feedback switching section 26 to the inverter control section 5 in accordance with the first embodiment shown in FIG. 2.

The configurations and operations of the active current computing section 13, the phase difference ø computing section 14, the phase difference ø command section 15, the adder 31A and the error voltage computing section 10A are similar to those in the second embodiment. The feedback switching section 26 selects one of the output of the error voltage computing section 10 and the output of the error voltage computing section 10A on the basis of the signal from the frequency setting section 6, and applies the selected output to the adder 32.

The feedback amounts of the reactive current Ir and the phase difference ø are different depending on the rotation frequency and the load of the motor. FIG. 15A to FIG. 15D are graphs showing the relationships among the reactive current Ir, phase difference ø and motor efficiency. FIG. 15A and FIG. 15B are graphs showing changes in motor efficiency at a low speed and a high speed, respectively, when the command value of the reactive current Ir is changed by using the load as a parameter. FIG. 15C and FIG. 15D are graphs showing changes in motor efficiency at a low speed and a high speed, respectively, when the command value of the phase difference ø is changed by using the load as a parameter. Furthermore, FIG. 15E is a graph showing the relationship between the rotation speed and the reactive current Ir by using the load as a parameter, when the speed is raised by the so-called field-weakening control while the voltage value of the DC power source (1) applied to the inverter 2 is constant. FIG. 15F is also a graph showing the relationship between the rotation speed and the phase difference ø by using the load as a parameter in the above-mentioned conditions.

According to FIG. 15C and FIG. 15D, the command value of the phase difference ø at which the motor 3 can be driven at high efficiency does not depend on the load, but greatly depends on the rotation speed. On the other hand, according to FIG. 15A and FIG. 15B, it is understood that the reactive current Ir depends on both the load and the rotation speed. Furthermore, according to FIG. 15E and FIG. 15F, since the change in the phase difference ø depending on the rotation speed becomes very small during the field-weakening control, it is difficult to set the command value of the phase difference ø corresponding to the rotation speed. On the other hand, since the reactive current Ir changes depending on the rotation speed, it is understood that the command value can be set easily.

Generally, the rotation speed is not stable at the start action of the motor 3, and the magnitude and direction of a induced voltage ω·ψ generating at each motor winding by a magnet is not stable. Hence, the magnitude and direction of the induced voltage Vo change greatly at the start operation of the motor, and the direction of the motor current Is changes greatly. Furthermore, the detection result of the phase difference ø also changes greatly, thereby taking a certain time until the motor 3 can be controlled stably. On the other hand, the fluctuation amount of the detection result of the phase difference α is smaller than that of the detection result of the phase difference ø. Hence, the phase difference α can be detected more easily in an unstable operation state, such as the start operation in particular, thereby being controllable easily. In this embodiment, a feedback loop having a command value and a feedback amount corresponding thereto is switched depending on the rotation frequency by the feedback switching section 26. As a result, the command value can be set easily, and the motor 3 can be driven at optimum conditions.

In the configuration shown in FIG. 14, the reactive current Ir or the phase difference ø is selected by the feedback switching section 26. Even when desired combinations from among five kinds of set values, i.e., the phase difference α, the phase difference β, the phase difference δ, the reactive current Ir and the phase difference ø, are formed as other selection examples and when one of the plurality of the combined set values is selected, it is possible to obtain a similar effect. At the start action of the motor 3, for example, the reactive current Ir, the phase difference α and the phase difference δ can be set easily because of the above-mentioned reason. When the rotation frequency exceeds a predetermined value after the start operation, a feedback loop is formed by appropriately selecting the phase difference ø, the phase difference β, the phase difference ø, etc. depending on the driving conditions of the motor 3. It is thus possible to attain a desired driving system. When the motor 3 is desired to be driven at the maximum output torque, for example, the phase difference β should only be selected. When the motor 3 is desired to be driven at a constant load, the phase difference δ should only be selected. When the motor 3 is desired to be driven at the maximum efficiency, the phase difference δ should only be selected. As described above, a desired motor controller can be attained by forming an appropriate feedback loop depending on the driving conditions of the motor 3.

Tenth Embodiment

FIG. 16 is a block diagram showing a motor controller in accordance with a 10th embodiment of the present invention. In FIG. 16, a voltage detection section 27 for detecting a DC voltage is provided between the DC power source 1 and the inverter circuit 2. An inverter control section 5K is obtained by adding a saturated voltage judgment section 28, to which the detection output of the voltage detection section 27 is applied, to the inverter control section 5J in accordance with the ninth embodiment shown in FIG. 14 and by changing the feedback switching section 26 of the inverter control section 5J to a feedback switching section 26A. The saturated voltage judgment section 28 compares the motor applied voltage command value Va with the DC voltage value detected by the voltage detection section 27, and applies the result of the comparison to the feedback switching section 26A. The feedback switching section 26A selects the output of the error voltage computing section 10 or the output of the error voltage computing section 10A depending on the result of the comparison and applies the output to the adder 32.

The maximum value of the voltage applicable to the motor 3 is limited by the DC power source 1. Hence, when the motor applied voltage command value Va is larger than the DC voltage value, the inverter circuit 2 cannot apply a desired voltage to the motor 3. In this case, field-weakening control is generally carried out. In the field-weakening control, the phase difference β between a motor current vector R×Is and the q axis shown in FIG. 3A is made larger. Hence, the d-axis component Id of the motor current Is is increased and the induced voltage Vo is decreased. As a result, the motor current Is is increased, but the motor applied voltage command value Va is decreased. It is thus possible to set the motor applied voltage command value Va at the voltage of the power source or less. Generally, the relationship between the rotation frequency and the required applied voltage of the motor is known in advance as a basic characteristic of the motor. Hence, a rotation frequency wherein the field-weakening control must be carried out owing to insufficient power source voltage is also known in advance. Therefore, it is possible to make a judgment as to whether the ordinary control or the field-weakening control is carried out depending on the rotation frequency of the motor. However, when the load or the power source voltage fluctuates, the rotation frequency at which the insufficient voltage occurs also fluctuates. It is thus difficult to judge the frequency at which the field-weakening control is selected.

In this embodiment, an insufficient voltage state is detected by the saturated voltage judgment section 28. When the insufficient voltage occurs, the feedback switching section 26A makes a change from the feedback loop for the phase difference ø to the feedback loop for the reactive current Ir. Hence, it is possible to accurately obtain the timing of the switching, whereby it is possible to attain more stable motor driving. As described in the explanations of the ninth embodiment, it is preferable that the feedback loop selection should be performed when the field-weakening control is carried out. When carrying out the field-weakening control, it is possible to attain a more stable motor controller by using the phase difference α, the phase difference β, the phase difference δ or the like in addition to the reactive current Ir.

Eleventh Embodiment

An 11th embodiment relates to a feedback loop switching, i.e., a control switching, in the motor controllers in the ninth and 10th embodiments. In the ninth and 10th embodiments, when a feedback loop switching is performed by the feedback switching section 26 or 26A, the average value of the command value at a plurality of control cycles, which is intended to be used after the selection, is computed in advance, and the average value is used as the command value after the selection. For example, when the state of control using the reactive current Ir is switched to the state of control using the phase difference ø, the phase difference ø is computed during the state of the control using the reactive current Ir. Furthermore, the average value of the result of the computation of the phase difference ø is obtained in advance. When the control is changed, the command value of the phase difference ø is used as the average value of the phase difference ø before the change of the control. By determining the initial value of the command value after the change in this way, stable control can be attained when the control has changed.

In this embodiment, in order to attain a more stable control change, a holding function is added to the feedback switching section 26 or the feedback switching section 26A so that the changed control state can be held for a predetermined time after the change of the control.

For example, when the change of the control is performed in the 10th embodiment, a comparison is made as to whether the motor applied voltage command value Va is larger than the voltage of the DC power source 1 or not, and a judgment is made depending on the result of the comparison. For example, when generating a direct current by full-wave rectifying an alternating current and by smoothing the rectified current by using a capacitor, the voltage of the obtained direct current fluctuates at a frequency two times as high as the frequency of the alternating current. Hence, the change of the control is repeated frequently, thereby causing hunting. When this hunting occurs, the rotation of the motor 3 becomes unstable. In order to solve this problem, the change of the control is not carried out for a predetermined time after the previous change of the control was performed. This can prevent frequent changing operations and can attain a more stable motor controller. The above-mentioned predetermined time is about five seconds for example. However, this time should only be determined to have a value not making the motor operation unstable at the time of the change.

Twelfth Embodiment

FIG. 17 is a block diagram showing a motor controller in accordance with a 12th embodiment of the present invention. In the motor controller in this embodiment, the voltage detection section 27 for detecting a DC voltage is installed between the DC power source 1and the inverter circuit 2 of the motor controller in the first embodiment shown in FIG. 2. An inverter control section 5L shown in FIG. 17 is obtained by adding a saturated voltage judgment section 28A to the inverter control section 5 shown in FIG. 2 and by changing the reactive current command section 9 of the inverter control section 5 to a reactive current command section 9A.

The output (DC voltage) of the voltage detection section 27 and the output (the motor applied voltage command value Va) of the adder 32 are applied to the saturated voltage judgment section 28A, and these outputs are compared with each other in magnitude. When the motor applied voltage command value Va is higher than the DC voltage, that is, when voltage saturation occurs, the saturated voltage judgment section 28A applies a value corresponding to the amount of the saturation to the reactive current command section 9A. Hence, the reactive current command value, that is, the output of the reactive current command section 9A, is changed to a value not causing voltage saturation. For example, the field-weakening control is carried out while increasing the reactive current command value, whereby the motor applied voltage command value Va is made smaller than the DC voltage. In this embodiment, the output value of the reactive current command section 9A is changed on the basis of the output of the saturated voltage judgment section 28A as described above, whereby it is possible to attain the field-weakening control at the time of voltage saturation.

In the above-mentioned explanation, the reactive current command value is changed. However, a similar effect can be obtained even when one of the command values, i.e., the phase difference ø,the phase difference α, the phase difference β and the phase difference δ, is changed. The output of the saturated voltage judgment section 28A is not limited to the value corresponding to the amount of voltage saturation. It may be possible to use an appropriate value corresponding to the rotation frequency or load of the motor.

FIG. 18A and FIG. 18B are graphs showing the operations of another preferable example of the motor controller in accordance with this embodiment. FIG. 18A shows the progresses of the motor applied voltage command value Va (shown in the intermediate graph) and the reactive current command value Ir* (shown in the bottom graph) in the case when the rotation frequency ω (shown in the top graph) is lower than the target value ω* of the rotation frequency. FIG. 18B shows the progresses of the motor applied voltage command value Va (shown in the intermediate graph) and the reactive current command value Ir* (shown in the bottom graph) in the case when the rotation frequency ω (shown in the top graph) is higher than the target value ω* of the rotation frequency.

As shown in the top graph of FIG. 18A, when the rotation frequency ω is not more than the target value ω* of the rotation frequency in a period from t1 to t4, the frequency setting section 6 increases the rotation frequency ω. The output of the V/f conversion section 11 increases as the rotation frequency ω increases. However, when the voltage of the DC power source 1 is not sufficiently high, a voltage corresponding to the output signal from the output command computing section 12 cannot be applied to the motor 3 by the inverter circuit 2. It is thus necessary to adjust the direction of the vector by carrying out the field-weakening control so that a desired rotation speed can be obtained. First, the voltage value Vdc of the DC power source 1 obtained from the voltage detection section 27 is compared with the motor applied voltage command value Va by the saturated voltage judgment section 28. As a result, as shown in the intermediate graph of FIG. 18A, when the motor applied voltage command value Va is larger than the voltage Vdc but smaller than a predetermined voltage value Vsat1 in a period from t1 to t2, the rotation frequency ω, i.e., the output of the frequency setting section 6, is increased. When the motor applied voltage command value Va becomes equal to and larger than the voltage value Vsat1 in a period from t2 to t3, the rotation frequency ω is fixed, and the output of the V/f conversion section 11 is held constant so that the motor applied voltage command value Va does not increase. When the motor applied voltage command value Va is larger than the voltage value Vdc, the reactive current command value Ir* from the reactive current command section is increased so that a field-weakening state is obtained. The larger the reactive current command value Ir*, the smaller the necessary motor applied voltage command value Va in a period from t3 to t4. By continuously carrying out both the operations, the motor applied voltage command value Va does not exceed the predetermined voltage value Vsat1. It is thus possible to carry out control so that the motor 3 has a desired rotation speed.

When lowering the rotation speed, a predetermined voltage value Vsat2 smaller than the voltage value Vdc is compared with the motor applied voltage command value Va as shown in the intermediate graph of FIG. 18B. When Va becomes smaller than Vsat2, the rotation speed is controlled so as not to be lowered. When the motor applied voltage command value Va is smaller than the voltage value Vdc in the period from t1 to t2, the reactive current command value Ir* is decreased, whereby the field weakening state is canceled. As a result, the motor applied voltage command value Va increases in the period from t3 to t4. By continuously carrying out the above-mentioned operation, it is possible to carry out control so that the rotation speed of the motor 3 becomes the desired value while canceling the field weakening state.

In this embodiment, the description has made as to the case wherein the reactive current command value Ir* is changed. However, similar control can be carried out even when one of the phase difference ø, the phase difference α, the phase difference β and the phase difference δ is changed, instead of the reactive current Ir.

Thirteenth Embodiment

FIG. 19 is a block diagram showing a motor controller in accordance with a 13th embodiment of the present invention. In FIG. 19, an inverter control section 5M is obtained by adding the active current computing section 13 and an instantaneous current computing section 29 to the inverter control section 5 in the first embodiment shown in FIG. 2 and by changing the frequency setting section 6 of the inverter control section 5 to a frequency setting section 6A. The active current computing section 13 performs the same operation as that of each embodiment. The instantaneous current computing section 29 performs the computation represented by the equation (15) from the active current Ia and the reactive current Ir, and outputs an instantaneous motor current Is. The output of the instantaneous current computing section 29 is applied to the frequency setting section 6A. When the value of the instantaneous motor current Is exceeds a predetermined value, the frequency setting section 6A is controlled so that the output value of the frequency setting section 6A is not changed.

When the motor 3 controlled by the motor controller in this embodiment is used for a compressor in an air conditioner or a refrigerator, or used for a fan or a pump, the load of the motor 3 increases as the rotation frequency of the motor 3 becomes higher. Hence, the value of the current flowing through the motor 3 tends to increase monotonously as the rotation frequency becomes higher. Generally, the inverter circuit 2 and the motor 3 each have the predetermined maximum current value. If a current larger than the maximum current value flows through the inverter circuit 2 or the motor 3, they are liable to be damaged. In this embodiment, the instantaneous current computing section 29 computes the instantaneous current flowing through the motor 3. When the instantaneous current exceeds a predetermined value, control is carried out so that the rotation frequency command output from the frequency setting section 6A does not increase. Therefore, the rotation frequency of the motor 3 is maintained constant, and the load does not increase, whereby it is possible to carry out safer motor control. When the instantaneous motor current Is exceeds the predetermined value, the rotation frequency of the motor may be lowered by issuing a command so that the rotation frequency command of the frequency setting section 6A is lowered. As a result, the load is lowered, and the motor current becomes smaller.

Fourteenth Embodiment

FIG. 20 is a block diagram showing a motor controller in accordance with a 14th embodiment of the present invention. In FIG. 20, an inverter control section 5N is obtained by changing the frequency setting section 6 of the inverter control section 5 in the first embodiment shown in FIG. 2 to a frequency setting section 6B and by changing the reactive current command section 9 of the inverter control section 5 to a reactive current command section 9B. In this embodiment, the output of the frequency setting section 6B is also applied to the reactive current command section 9B.

The reactive current command section 9B receives a rotation frequency command from the frequency setting section 6B, generates the reactive current command value Ir* depending on the value of the command, and outputs the reactive current command value Ir* to the adder 31.

As another preferable example of the motor controller in accordance with this embodiment, the active current computing section 13 may be provided in the inverter control section 5N, and the output of the active current computing section 13 may be applied to the reactive current command section 9 (this configuration is not shown). In this example, the reactive current command section 9B receives the active current detected value Ia from the active current computing section 13, generates the reactive current command value Ir* depending on the value, and outputs the reactive current command value Ir* to the adder 31.

As still another preferable example of the motor controller in accordance with this embodiment, the active current computing section 13 and the instantaneous current computing section 29 may be provided in the inverter control section 5N, and the output of the instantaneous current computing section 29 may be input to the reactive current command section 9B (this configuration is not shown). The reactive current command section 9B receives the detected value of the instantaneous current, i.e., the motor current Is, from the instantaneous current computing section 29, generates the reactive current command value Ir* depending on the value, and outputs the reactive current command value Ir* to the adder 31.

As yet still another example of the motor controller in accordance with this embodiment, the voltage detection section 27 may be provided, and the output of the voltage detection section 27 may be input to the reactive current command section 9B (this configuration is not shown). The reactive current command section 9B receives the detected value Vdc of the power source voltage from the voltage detection section 27, generates the reactive current command value Ir* depending on the value, and outputs the reactive current command value Ir* to the adder 31.

As shown in FIG. 15A and FIG. 15B, in order to operate the motor 3 so as to keep the maximum motor efficiency, the reactive current command value Ir* must be changed depending on the rotation frequency and load of the motor 3. In this embodiment, the rotation frequency and the reactive current command value at which the maximum motor efficiency is obtained are determined in advance so that they correspond to each other. The reactive current command section 9B receives the command value of the rotation frequency from the frequency setting section 6B, and outputs the reactive current command value corresponding to the rotation frequency. Hence, the motor 3 can be operated while the motor efficiency is maintained high at all times. The instantaneous motor current or active current relates to the load. Therefore, by inputting the output of the instantaneous current computing section 29 or the output of the active current computing section 13 to the reactive current command section 9B, it is possible to operate the motor 3 while the motor efficiency is maintained high at all times.

When the voltage of the power source lowers abruptly owing to an instantaneous power failure or the like, the voltage applied to the motor 3 also lowers, whereby the rotation speed of the motor 3 decreases. As a result, the control pulse signal of the inverter circuit 2 is controlled so that its duty ratio increases. However, since the voltage of the power source is low, the duty ratio reaches 100% immediately. Therefore, the motor applied voltage command value Va cannot be raised further, and the motor 3 becomes uncontrollable. When a field-weakening state is obtained by increasing the reactive current command value Ir*, the voltage Vd of the power source can be made equal to or larger than the motor applied voltage command value Va. As a result, it is possible to continue the normal driving of the motor 3.

The inverter control section may be configured by adding a function similar to the above-mentioned function to one of the phase difference ø command section, the phase difference α command section, the phase difference β command section and the phase difference δ command section, instead of the reactive current command section.

15th Embodiment

A 15th embodiment relates to a motor controller in the case when a motor having a non-salient pole rotor, that is, a motor having magnets disposed on the surface of the rotor, is used as the motor 3. In this case, the output value of the phase difference β command section is set to zero.

The output torque T of a synchronous motor is generally represented by Equation (16).

$$T = \psi \times Iq + (Lq - Ld) \times Id \times Iq \quad (16)$$

In the case of the non-salient pole motor, the inductance Ld in the direction of the d axis and the inductance Lq in the direction of the q axis are equal to each other. Hence, the output torque T of the motor can be represented by Equation (17) by using the phase difference β.

$$T = \psi \times Iq = \psi \times Is \times \cos\beta \quad (17)$$

The maximum torque is obtained when cos β=1, that is, when the phase difference β is zero. At this time, the current in the direction of the d axis becomes zero. Hence, in the case of high torque control wherein control is carried out so that the motor 3 rotates at high torque, the command value of the phase difference β should be set to zero.

In this embodiment, high torque control can be carried out at all times by setting the command value of the phase difference β to zero as described above. It is thus possible to attain stable motor driving at various loads.

16th Embodiment

A 16th embodiment relates to a motor controller in the case when a motor having a salient pole rotor, that is, a motor having magnets disposed in the interior of the rotor, is used as the motor 3. The motor controller in accordance with this embodiment is configured so that the output of the reactive current computing section 8 and the output of the active current computing section 13 are input to the phase difference β command section 19 of the inverter controller 5C in the block diagram of the motor controller shown in FIG. 6 and described in the explanations of the fourth embodiment. This configuration however is not shown.

The phase difference β command section 19 computes the instantaneous motor current Is from the output Ir of the reactive current computing section 8 and the output Ia of the active current computing section 13 in accordance with Equation (15). Next, the phase difference β, that is, the output of the phase difference β command section, is computed in accordance with Equation (18), and is output.

$$\beta = \mathrm{Sin}^{-1}\left(\frac{-\psi + \sqrt{\psi^2 + 8 \times (Lq - Ld)^2 \times Is^2}}{4 \times (Lq - Ld) \times Is}\right) \quad (18)$$

The general equation of the output torque T of the salient pole motor is Equation (16). By differentiating Equation (16) with respect to the phase difference β, Equation (19) is obtained.

$$\frac{\partial T}{\partial \beta} = -2 \times (Lq - Ld) \times Is^2 \times \sin^2\beta - \psi \times Is \times \sin\beta + (Lq - Ld) \times Is^2 \quad (19)$$

In order to obtain the maximum output torque, the phase difference β should only be determined so that the resultant value of the Equation (19) becomes zero. Since Equation (19) is a quadratic equation with respect to sin β, Equation (18) can be obtained by solving Equation (19) with respect to β. In Equation (18), ψ represents a magnetic flux, and Ld and Lq represent the inductance in the direction of the d axis and the inductance in the direction of the q axis, respectively. The magnetic flux ψ, and the inductances Ld and Lq can be known from the characteristics of the motor 3 in advance. Furthermore, the instantaneous motor current Is can be computed from Equation (15), whereby the phase difference β command value β can be generated by using Equation (18).

With this embodiment, it is possible to attain a motor controller capable of driving a motor at the maximum torque at all times in the motor control using a salient pole motor.

Seventeenth Embodiment

FIG. 21 is a block diagram showing a motor controller in accordance with a 17th embodiment of the present invention. In FIG. 21, a motor voltage detection section 36 is provided between the motor current detection section 4 and the motor 3. In addition, the voltage detection section 27 is provided between the DC power source 1 and the inverter circuit 2. An inverter control section 5P is obtained by adding a position estimation section 37, a frequency computing section 38, a saturated voltage judgment section 28B, an adder 39, a speed error computing section 40 and a selection section 25 to the inverter control section 5 in the first embodiment shown in FIG. 2. Furthermore, in FIG. 21, the wave generation section 7 and the output command computing section 12 shown in FIG. 2 are changed to a wave generation section 7A and an output command computing section 12A, respectively. In this embodiment, the switching section 25 selects the output of the speed error computing section 40 or the output of the adder 32, whereby sine wave driving or rectangular wave driving can be selected as an energization method for the motor 3. In other words, the saturated voltage judgment section 28B compares the signal from the voltage detection section 27 with the signal from the adder 32 in magnitude. When the signal from the adder 32 is larger than the signal from the voltage detection section 27, the energization method is switched from the sine wave driving to the rectangular wave driving by the output command computing section 12A, the wave generation section 7A and the selection section 25.

The motor voltage detection section 36 detects a voltage applied to the motor 3, and applies the detection output to the position estimation section 37. The position estimation section 37 estimates the position of the rotor of the motor 3 on the basis of the detection output of the motor voltage detection section 36, and applies an output indicating the estimated position to the frequency computing section 38. The position of the rotor can be estimated by carrying out a rectangular wave energization known generally. The estimation can be carried out by detecting the voltage across the terminals of the motor 3 by using the motor voltage detection section 36, by comparing the detected voltage with a voltage Vdc/2, i.e., ½ of the voltage Vdc of the DC power source 1, and by detecting a timing signal output at timing wherein both the voltages coincide with each other. The frequency computing section 38 computes the rotation frequency of the motor 3 on the basis of the timing signal output from the position estimation section 37, and outputs the rotation frequency to the adder 39. The position of the rotor of the motor 3 can be estimated every electrical angle of 60 degrees in the case of a three-phase circuit. Hence, the frequency computing section 38 obtains the rotation frequency of the motor 3 by carrying out computation based on the cycle of 60 degrees of electrical angle. The adder 39 computes the rotation speed error between the rotation frequency command value serving as the output of the frequency setting section 6 and the output of the frequency computing section 38, and applies the error to the speed error computing section 40. The speed error computing section 40 generates a motor applied voltage command value on the basis of the rotation speed error of the adder 39, and applies the command value to the switching section 25. On the basis of the output of the saturated voltage judgment section 28B, the switching section 25 selects the output of the adder 32 or the output of the speed error computing section 40, and applies the selected output to the output command computing section 12A. The configurations of the voltage detection section 27 and the saturated voltage judgment section 28B shown in FIG. 21 are similar to those of the voltage detection section 27 and the saturated voltage judgment section 28 in accordance with the 10th embodiment shown in FIG. 16. The saturated voltage judgment section 28B applies the result of the judgment to the switching section 25 and the wave generation section 7A. The wave generation section 7A selects the output of the position estimation section 37 or the output of the frequency setting section 6 on the basis of the result of the judgment from the saturated voltage judgment section 28B. Furthermore, the wave generation section 7A applies the selected output to the reactive current computing section 8 and the output command computing section 12A.

When the voltage obtained at the output command computing section 12A saturates, the rotation frequency of the motor 3 is sufficiently high. Consequently, there is almost no difference in noise and vibration between the sine wave driving and the rectangular wave driving of the motor 3 owing to the inertia effect of the rotor. In such a case, the loss in the inverter circuit 2 is reduced by driving the inverter circuit 2 by using pulse amplitude modulation (PAM), instead of a driving method wherein switching operation is performed. In this embodiment, a judgment is made as to whether the motor voltage is saturated or not, and rectangular wave energization or sine wave energization is switched depending on the result of the judgment. It is thus possible to attain a motor controller capable of driving a motor efficiently even at a high rotation frequency. The energization angle of the rectangular wave energization in this embodiment is 120 degrees. However, an energization angle other than 120 degrees may be used, if it is possible to detect a timing at which the voltage across the motor terminals coincides with the half of the power source voltage. In other words, the energization angle in this embodiment is not limited to 120 degrees.

In this embodiment, the sine wave driving and the rectangular wave driving are selectively used depending on the output of the saturated voltage judgment section 28B. However, when the rotation frequency of the motor 3 is high, the efficiency of the motor becomes higher in some cases in the rectangular wave driving, regardless of the output of the saturated voltage judgment section 28B, that is, regardless of saturation. In this case, the frequency setting section 6 makes a judgment as to whether the frequency is more than a predetermined frequency or not. The result of the judgment is then output to the wave generation section 7A, the switching section 25 and the output command computing section 12A (this configuration is not shown). This output may be used for the switching between the sine wave driving and the rectangular wave driving. In other words, the rectangular wave driving is selected when the frequency is more than the predetermined frequency. In this embodiment, the sine wave driving is changed to the rectangular wave driving when a reactive current is detected. However, the sine wave driving may be changed to the rectangular wave driving by using one of the phase difference ø, the phase difference α, the phase difference β and the phase difference δ.

In this embodiment, if the timing of the switching and the voltage to be applied to the inverter circuit 2 are not selected appropriately when the sine wave driving is changed to the rectangular wave driving, changing operation cannot be performed smoothly, and motor rotation may stop owing to the loss of synchronization. In order to prevent this, the continuity of the magnetic flux of the motor should only be maintained before and after the change. In other words, it is necessary to prevent the amount of the magnetic flux of the motor from abrupt variation before and after the change. For this purpose, both the applied voltage command value in the sine wave driving and the applied voltage command value in the rectangular wave driving should only satisfy the relationship of Equation (20).

$$\Phi m = \int_0^\pi Vp\sin\theta d\theta = \int_{\frac{\pi}{6}}^{\frac{5\pi}{6}} Vad\theta \qquad (20)$$

In order to satisfy Equation (20), the continuity of the motor current should only be maintained, and the voltage to be applied to the motor should only be determined so that the amount of the magnetic flux is constant. At the time of the change from the sine wave driving to the rectangular wave driving, an initial voltage value after the change is determined depending on the peak value and the energization period of a sine wave voltage. When the sine wave driving is changed to the rectangular wave driving having an electrical angle of 120 degrees, for example, it is assumed that the magnetic flux of the motor is øm, that the peak value of the sine wave voltage is Vp and that the average voltage in the energization period of the rectangular wave is the motor applied voltage command value Va. The relationship between the magnetic flux øm and the motor applied voltage command value Va in a half cycle is represented by Equation (20). By setting a motor voltage immediately after the change at the motor applied voltage command value Va so as to satisfy Equation (20), smooth rotation is maintained even after the change.

Eighteenth Embodiment

FIG. 22 shows a connection among the inverter circuit 2, the motor current detection section 4 having two current sensors 4A and 4B and the motor 3. These are included commonly in the motor controller in accordance with each embodiment of the present invention. The inverter circuit 2, the motor current detection section 4 and the motor 3 shown in FIG. 22 are combined with the inverter control section in each embodiment, thereby forming a motor controller. This embodiment relates to the correction of errors in the two current sensors 4A and 4B of the motor current detection section 4.

The two current sensors 4A and 4B of the motor current detection section 4 are broad band sensors capable of detecting direct and alternating currents. The current sensors detect currents flowing through two-phase windings, i.e., the U and W phase windings indicated in solid lines, for example, from among the three U, V and W phase windings. A U-phase switching device 41 and a W-phase switching device 46, disposed in the inverter circuit 2 and indicated in sold lines, are turned ON simultaneously for a short time. Direct currents having the same value flow through the U and w phase windings, but no rotating magnetic field is generated. The direct currents having the same value also flow through the current sensors 4A and 4B. The difference in sensitivity between the two current sensors 4A and 4B can be measured at high accuracy by comparing the detection outputs of the current sensors 4A and 4B with each other. The currents passing through the U and W phase windings can be detected properly by obtaining the average value of the difference in sensitivity, and by correcting the detection outputs of the current sensors 4A and 4B by using the average value. An error in the measurement of the motor current by the motor current detection section 4 causes noise at the outputs of the reactive current computing section and the active current computing section, thereby exerting adverse effects. However, the motor current detection section 4 in this embodiment can detect the current flowing through each phase winding accurately by the correction of the difference in sensitivity, whereby it is possible to attain stable feedback control.

Nineteenth Embodiment

FIG. 23 is a block diagram showing a motor controller in accordance with a 19th embodiment of the present invention. In this embodiment, alternating current sensors are used for a motor current detection section 4E for detecting the current of the motor 3. The current sensors 4A and 4B included in the motor current detection section 4 in each embodiment described above and capable of detecting direct and alternating currents are relatively expensive. This embodiment is intended to provide an inexpensive motor controller comprising inexpensive alternating current sensors.

An inverter control section 5Q is obtained by changing the phase difference ø computing section 14 of the inverter control section 5A in the second embodiment shown in FIG. 4 to a phase difference ø computing section 14A. The outputs of the reactive current computing section 8 and the active current computing section 13, and the output of the frequency setting section 6 are applied to the phase difference ø computing section 14A. The phase difference ø computing section 14A outputs a phase difference ø whose phase is corrected on the basis of the characteristics of the alternating current sensor described below from the outputs of the reactive current computing section 8, the active current computing section 13 and the frequency setting section 6. The output is then applied to the adder 31A.

FIG. 24A is a graph showing the relationship between a frequency and an input/output phase difference, when the current value of the alternating current sensor is used as a parameter. FIG. 24B is a graph showing the relationship between a frequency and an output voltage. In the alternating current sensor, it is known that the phase of the detected current becomes different from the phase of the detection output voltage depending on the magnitude and frequency of the current as generally shown in FIG. 24A. When the magnitude and frequency of the current are known, it is possible to know the difference in phase (phase difference) between the current and the voltage. A function or table for use in computing the difference in phase (phase difference) between the current and the frequency is stored beforehand in the phase difference ø computing section 14A shown in FIG. 23. The phase difference ø computing section 14A obtains the magnitude and frequency of the current from each of the signals of the frequency setting section 6, the reactive current computing section 8 and the active current computing section 13. Furthermore, the phase difference ø computing section 14A obtains the phase difference γ between the voltage and the current, i.e., the output characteristics of the alternating current sensor, by using the function or table. Still further, the phase difference ø computing section 14A obtains the phase difference ø from the outputs of the reactive current computing section 8 and the active current computing section 13 which are used usually. The phase difference ø computing section 14A applies to the adder 31A a phase difference obtained as the result of a correction wherein the phase difference γ is subtracted from the phase difference ø. It is thus possible to carry out the phase correction of the alternating current sensor.

In this embodiment, since the phase difference between the voltage and the current, inherent in the alternating current sensor, can be corrected, it is possible to attain a low-cost motor controller comprising relatively inexpensive alternating current sensors.

As shown in FIG. 24B, the output voltage (amplitude) of the alternating current sensor changes depending on the frequency when the current is used as a parameter. By preparing a function or table representing the relationship shown in FIG. 24B beforehand in the phase difference ø computing section 14A, the alternating current sensor can detect the current of the motor 3 more accurately. By using the result of this detection, it is possible to attain a motor controller that carries out control by using one of the reactive current, the phase difference α, the phase difference β and the phase difference δ as a command value. The current value detected by the alternating current sensor becomes a current vector indicated by R·Is' in the vector graph of FIG. 25. This current vector includes the error between the phase difference γ and the amplitude of the current sensor. By correcting both, it is possible to obtain the result of the correct detection, that is, the current vector R·Is. By using the reactive and active currents obtained as described above for the control of the inverter control section 5Q, it is possible to attain a motor controller having a high accuracy similar to those of the motor controllers in accordance with the above-mentioned embodiments 1 to 18, even when inexpensive alternating current sensors are used.

What is claimed is:

1. An electric motor controller comprising:
   an inverter circuit having switching devices and diodes for converting a direct current into an alternating current (AC) and supplying an AC power to a motor,
   a motor current detection section for detecting a current flowing through said motor and outputting a detected signal, and
   an inverter control section for controlling said inverter circuit on the basis of the output of said motor current detection section, wherein
   said inverter control section comprises:
      a frequency setting section for outputting the command signal of the rotation frequency of said motor,
      a wave generation section for generating a rotation phase signal from the command signal of said frequency setting section,
      a reactive current computing section for computing a reactive current from the rotation phase signal of said wave generation section and the detected signal of said motor current detection section,
      a reactive current command section for outputting the command value of the reactive current,
      an error voltage computing section for computing an error voltage from the difference between the output of said reactive current computing section and the output of said reactive current command section,
      a V/f conversion section for obtaining a reference voltage from the command signal of said frequency setting section,
      an adder for computing a command value of voltage applied to the motor from the outputs of said error voltage computing section and said V/f conversion section, and
      an output command computing section for generating a control signal from the outputs of said wave generation section and said adder and supplying the control signal to said inverter circuit.

2. A motor controller in accordance with claim 1, wherein said inverter control section comprises:
   a phase compensation section for generating a phase compensation amount from one of:
      the difference between the output of said reactive current command section and the output of said reactive current computing section,
      the difference between the output of said phase difference ø command section and the output of said phase difference ø computing section,
      the difference between the output of said phase difference a command section and the output of said phase difference a computing section,
      the difference between the output of said phase difference β command section and the output of said phase difference β computing section and
      the difference between the output of said phase difference d command section and the output of said phase difference d computing section, and
   an adder for adding said phase compensation amount to the output of said wave generation section.

3. A motor controller in accordance with claim 2, wherein said inverter control section comprises:
   a variation computing section for amplifying the difference between the last and present results of computations repeated at predetermined time cycles by using one computing section selected from among said reactive current computing section, said phase difference ø computing section, said phase difference a computing section, said phase difference β computing section and said phase difference d computing section.

4. A motor controller in accordance with claim 2, wherein said inverter control section comprises:
   a current compensation section for computing the difference between the average value of an instantaneous current obtained on the basis of the outputs of said active current computing section and said reactive current computing section and the instantaneous value of said instantaneous current.

5. A motor controller in accordance with claim 2, wherein said inverter control section comprises:
   at least two command sections selected from among said reactive current command section, said phase difference ø command section, said phase difference a command section, said phase difference β command section and said phase difference d command section,
   at least two computing sections selected from among said reactive current computing section, said phase difference ø computing section, said phase difference a computing section, said phase difference β computing section and said phase difference d computing section, corresponding to said selected plurality of command sections, and
   a feedback switching section for selecting one of at least two feedback loops on the basis of the outputs of at least two said command sections and at least two said computing sections corresponding to one another.

6. A motor controller in accordance with claim 5, wherein the command value of one of said reactive current command section, said phase difference Ø command section, said phase difference a command section, said phase difference β command section and said phase difference d command section, selected by said feedback switching section, is set as the average value of one of said reactive current computing section, said phase difference Ø computing section, said phase difference a computing section, said phase difference β computing section and said phase difference d computing section before the selection.

7. A motor controller in accordance with claim 6, wherein after the selection by said feedback switching section the state of said feedback loop is held in the state obtained after the selection during a predetermined period.

8. A motor controller in accordance with claim 2, further comprising:
 a voltage detection section for detecting the voltage of said direct current and outputting the detected signal, and
 a saturated voltage determination section for determining the saturation of the voltage on the basis of the signal from said voltage detection section and said motor applied voltage command value, wherein
 the output of one of said reactive current command section, said phase difference Ø command section, said phase difference a command section, said phase difference β command section and said phase difference d command section is changed on the basis of the output of said saturated voltage determination section.

9. A motor controller in accordance with claim 8, wherein said inverter control section carries out control so that the output of said frequency setting section does not increase when said command value of voltage applied to the motor exceeds a first predetermined voltage value larger than the signal from said voltage detection section, and said inverter control section carries out control so that the output of said frequency setting section does not decrease when said command value of voltage applied to the motor is below a second predetermined voltage value smaller than the output of said voltage detection section.

10. A motor controller in accordance with claim 2, said inverter control section comprises:
 an instantaneous current computing section for computing an instantaneous current on the basis of the output of said reactive current computing section and the output of said active current computing section, wherein the output of said frequency setting section is held constant for a predetermined time when the output of said instantaneous current computing section is larger than a predetermined value.

11. A motor controller in accordance with claim 2, said inverter control section comprises:
 an instantaneous current computing section for computing an instantaneous current on the basis of the output of said reactive current computing section and the output of said active current computing section, wherein one of the outputs of said frequency setting section, said reactive current command section, said phase difference Ø command section, said phase difference a command section, said phase difference β command section and said phase difference d command section is made small in the case when the output of said instantaneous current computing section is larger than a predetermined value.

12. A motor controller in accordance with claim 2, wherein
 said inverter control section changes one of the outputs of said reactive current command section, said phase difference Ø command section, said phase difference a command section, said phase difference β command section and said phase difference d command section.

13. A motor controller in accordance with claim 1, further comprising:
 a motor voltage detection section for detecting the voltage of said motor, and
 a voltage detection section for detecting the voltage of said direct current, wherein
 said inverter control section further comprises:
  a position estimation section for detecting the position of the rotor of said motor on the basis of the output of said motor voltage detection section.
  a frequency computing section for obtaining the rotation frequency of said motor on the basis of the output of said position estimation section,
  an error speed computing section for obtaining the error of the motor rotation speed from the output of said frequency setting section and the output of said frequency computing section, and
  a switching section for selecting said command value of voltage applied to the motor or the output of said error speed computing section, wherein
  when said switching section selects the output of said error speed computing section, said wave generation section outputs a signal having a rectangular rotation phase waveform.

14. A motor controller in accordance with claim 13, wherein
 when the waveform generated by said wave generation section is changed from a sine wave to a rectangular wave or from a rectangular wave to a sine wave,
 the output of said output command computing section immediately after the change is set so that the amount of the magnetic flux of said motor is maintained to the amount of the magnetic flux before the change.

15. A motor controller in accordance with claim 1, wherein
 said motor current detection section has current sensors for detecting currents having two or more different phases, and
 when a one-phase switching device included in said inverter circuit turns ON before said motor is driven, the currents of the two or more phases of the motor windings are measured, the average value thereof is obtained, and the average value is used to correct the detected current of said motor current detection section.

16. An electric motor controller comprising:
 an inverter circuit having switching devices and diodes for converting a direct current into an alternating current (AC) and supplying an AC power to a motor,
 a motor current detection section for detecting a current flowing through said motor and outputting a detected signal, and
 an inverter control section for controlling said inverter circuit on the basis of the output of said motor current detection section, wherein
 said inverter control section comprises:
  a frequency setting section for outputting the command signal of the rotation frequency of said motor,
  a wave generation section for generating a rotation phase signal from the command signal of said frequency setting section, a reactive current computing section for computing a reactive current and an active current computing section for computing an active current, from the rotation phase signal of said wave generation section and the detected signal of said motor current detection section, a phase difference Ø computing section for computing a phase difference Ø from the outputs of said reactive current computing section and said active current computing section, a phase difference Ø command section for outputting the command value of the phase difference Ø, an error voltage computing section for computing an error voltage from the difference between the output of said phase difference Ø command section and the output of said phase difference Ø computing section, a V/f conversion section for obtaining a reference voltage from the command signal of said frequency setting section, an adder for computing said command value of voltage applied to the motor from the outputs of said error voltage computing section and said V/f conversion section, and an output command computing section for generating a control signal from the outputs of said wave generation section and said adder and supplying the control signal to said inverter circuit.

17. An electric motor controller comprising:
an inverter circuit having switching devices and diodes for converting a direct current into an alternating current (AC) and supplying an AC power to a motor,
a motor current detection section for detecting a current flowing through said motor and outputting a detected signal, and
an inverter control section for controlling said inverter circuit on the basis of the output of said motor current detection section, wherein
said inverter control section comprises:
    a frequency setting section for outputting the command signal of the rotation frequency of said motor,
    a wave generation section for generating a rotation phase signal from the command signal of said frequency setting section,
    a reactive current computing section for computing a reactive current and an active current computing section for computing an active current, from the rotation phase signal of said wave generation section and the detected signal of said motor current detection section,
    a phase difference a computing section for computing a phase difference a between a motor applied voltage and a motor induced voltage from the output of said reactive current computing section, the output of said active current computing section and a command value of voltage applied to the motor,
    a phase difference a command section for outputting the command value of the phase difference a,
    an error voltage computing section for computing an error voltage from the difference between the output of said phase difference a command section and the output of said phase difference a computing section,
    a V/f conversion section for obtaining a reference voltage from the command signal of said frequency setting section,
    an adder for computing said command value of voltage applied to the motor from the outputs of said error voltage computing section and said V/f conversion section, and
    an output command computing section for generating a control signal from the outputs of said wave generation section and said adder and supplying the control signal to said inverter circuit.

18. An electric motor controller comprising:
an inverter circuit having switching devices and diodes for converting a direct current into an alternating current (AC) and supplying an AC power to a motor,
a motor current detection section for detecting a current flowing through said motor and outputting a detected signal, and
an inverter control section for controlling said inverter circuit on the basis of the output of said motor current detection section, wherein
said inverter control section comprises:
    a frequency setting section for outputting the command signal of the rotation frequency of said motor,
    a wave generation section for generating a rotation phase signal from the command signal of said frequency setting section,
    a reactive current computing section for computing a reactive current and an active current computing section for computing an active current, from the rotation phase signal of said wave generation section and the detected signal of said motor current detection section,
    a phase difference β computing section for computing a phase difference β between the reference axis of the rotor of said motor and the motor current from the output of said reactive current computing section, the output of said active current computing section, the command value of the command value of voltage applied to the motor and the command signal of said frequency setting section,
    a phase difference β command section for outputting the command value of the phase difference β,
    an error voltage computing section for computing an error voltage from the difference between the output of said phase difference β command section and the output of said phase difference β computing section,
    a V/f conversion section for obtaining a reference voltage from the command signal of said frequency setting section,
    an adder for computing said command value of voltage applied to the motor from the outputs of said error voltage computing section and said V/f conversion section, and
    an output command computing section for generating a control signal from the outputs of said wave generation section and said adder and supplying the control signal to said inverter circuit.

19. A motor controller in accordance with claim 18, wherein
said motor is a non-salient pole motor, and
said inverter control section sets the output of said phase difference β command section at zero.

20. A motor controller in accordance with claim 18, wherein
said motor is a salient pole motor, and
said inverter control section determines the output of said phase difference β command section on the basis of the outputs of said reactive current computing section and said active current computing section.

21. An electric motor controller comprising:
an inverter circuit having switching devices and diodes for converting a direct current into an alternating current (AC) and supplying an AC power to a motor, a motor current detection section for detecting a current flowing through said motor and outputting a detected signal, and an inverter control section for controlling said inverter circuit on the basis of the output of said motor current dection section, wherein said inverter control section comprises:

a frequency setting section for outputting the command signal of the rotation frequency of said motor, a wave generation section for generating a rotation phase signal from the command signal of said frequency setting section, a reactive current computing section for computing a reactive current and an active current computing section for computing an active current, from the rotation phase signal of said wave generation section and the detected signal of said motor current detection section, a phase difference d computing section for computing a phase difference d between the reference axis of the rotor of said motor and the applied voltage from the output of said reactive current computing section, the output of said active current computing section, the command value of the motor applied voltage and the command signal of said frequency setting section, a phase difference d command section for outputting the command value of the phase difference d, an error voltage computing section for computing an error voltage from the difference between the output of said phase difference d command section and the output of said phase difference d computing section, a V/f conversion section for obtaining a reference voltage from the command signal of said frequency setting section, an adder for computing said command value of voltage applied to the motor from the outputs of said error voltage computing section and said V/f conversion section, and an output command computing section for generating a control signal from the outputs of said wave generation section and said adder and supplying the control signal to said inverter circuit.

22. A compressor for use in an air conditioner and a refrigerator including a motor controller, the motor controller comprising:

an inverter circuit having switching devices and diodes for converting a direct current into an alternating current (AC) and supplying an AC vower to a motor, a motor current detection section for detecting a current flowing through said motor and outputting a detected signal, and an inverter control section for controlling said inverter circuit on the basis of the output of said motor current detection section, wherein said inverter control section comprises:

a frequency setting section for outputting the command signal of the rotation frequency of said motor, a wave generation section for generating a rotation phase signal from the command signal of said frequency setting section, a reactive current computing section for computing a reactive current from the rotation phase signal of said wave generation section and the detected signal of said motor current detection section, a reactive current command section for outputting the command value of the reactive current, an error voltage computing section for computing an error voltage from the difference between the output of said reactive current computing section and the output of said reactive current command section, a V/f conversion section for obtaining a reference voltage from the command signal of said frequency setting section.

an adder for computing a command value of voltage applied to the motor from the outputs of said error voltage computing section and said V/f conversion section, and an output command computing section for generating a control signal from the outputs of said wave generation section and said adder and supplying the control signal to said inverter circuit.

23. A fan including a motor controller, the motor controller comprising:

an inverter circuit having switching devices and diodes for converting a direct current into an alternating current (AC) and supplying an AC power to a motor, a motor current detection section for detecting a current flowing through said motor and outputting a detected signal, and an inverter control section for controlling said inverter circuit on the basis of the output of said motor current detection section, wherein said inverter control section comprises:

a frequency setting section for outputting the command signal of the rotation frequency of said motor, a wave generation section for generating a rotation phase signal from the command signal of said frequency setting section, a reactive current computing section for computing a reactive current from the rotation phase signal of said wave generation section and the detected signal of said motor current detection section, a reactive current command section for outputting the command value of the reactive current, an error voltage computing section for computing an error voltage from the difference between the output of said reactive current computing section and the output of said reactive current command section, a V/f conversion section for obtaining a reference voltage from the command signal of said frequency setting section, an adder for computing a command value of voltage applied to the motor from the outputs of said error voltage computing section and said V/f conversion section, and an output command computing section for generating a control signal from the outputs of said wave generation section and said adder and supplying the control signal to said inverter circuit.

24. A pump including a motor controller, the motor controller comprising:

an inverter circuit having switching devices and diodes for converting a direct current into an alternating current (AC) and supplying an AC power to a motor, a motor current detection section for detecting a current flowing through said motor and outputting a detected signal, and an inverter control section for controlling said inverter circuit on the basis of the output of said motor current detection section, wherein said inverter control section comprises:

a frequency setting section for outputting the command signal of the rotation frequency of said motor, a wave generation section for generating a rotation phase signal from the command signal of said frequency setting section, a reactive current computing section for computing a reactive current from the rotation phase signal of said wave generation section and the detected signal of said motor current detection section.

a reactive current command section for outputting the command value of the reactive current, an error voltage computing section for computing an error voltage from the difference between the output of said reactive current computing section and the output of said reactive current command section.

a V/f conversion section for obtaining a reference voltage from the command signal of said frequency setting section, an adder for computing a command value of voltage applied to the motor from the outputs of said error voltage computing section and said V/f conversion section, and an output command computing section for generating a control signal from the outputs of said wave generation section and said adder and supplying the control signal to said inverter circuit.

* * * * *

UNITED STATES PATENT AND TRADEMARK OFFICE
CERTIFICATE OF CORRECTION

PATENT NO. : 6,850,031 B2
DATED : February 1, 2005
INVENTOR(S) : Hideki Nakata et al.

It is certified that error appears in the above-identified patent and that said Letters Patent is hereby corrected as shown below:

Title page,
Item [75], Inventor, should read as follows:
-- Hideki Nakata, Shijonawate-shi (JP);
Kaneharu Yoshioka, Katano-shi (JP);
Mitsuo Ueda, Nishinomiya-shi (JP);
Yasuhiro Arai, Hirakata-shi (JP) --;

Column 37,
Line 48, "vower" should read -- power --.

Signed and Sealed this

Fifth Day of July, 2005

JON W. DUDAS
*Director of the United States Patent and Trademark Office*